(12) United States Patent
Stevens et al.

(10) Patent No.: US 9,471,656 B2
(45) Date of Patent: Oct. 18, 2016

(54) MASSIVELY-PARALLEL SYSTEM ARCHITECTURE AND METHOD FOR REAL-TIME EXTRACTION OF HIGH-VALUE INFORMATION FROM DATA STREAMS

(71) Applicant: UDA, LLC, San Jose, CA (US)

(72) Inventors: Luis Stevens, San Jose, CA (US); Vince Schiavone, San Jose, CA (US); Jonathan Hsieh, San Jose, CA (US)

(73) Assignee: UDA, LLC, San Jose, CA (US)

( * ) Notice: Subject to any disclaimer, the term of this patent is extended or adjusted under 35 U.S.C. 154(b) by 245 days.

(21) Appl. No.: 14/214,443

(22) Filed: Mar. 14, 2014

(65) Prior Publication Data

US 2014/0297652 A1 Oct. 2, 2014

Related U.S. Application Data

(60) Provisional application No. 61/802,353, filed on Mar. 15, 2013.

(51) Int. Cl.
*G06F 17/30* (2006.01)
*G06Q 50/00* (2012.01)

(52) U.S. Cl.
CPC ... *G06F 17/30572* (2013.01); *G06F 17/30486* (2013.01); *G06F 17/30516* (2013.01); *G06Q 50/01* (2013.01)

(58) Field of Classification Search
CPC ............... G06F 17/30572; G06F 17/30486; G06F 17/30516; G06Q 50/01
USPC ............. 707/722, 723, 731, 754, 755, 756
See application file for complete search history.

(56) References Cited

U.S. PATENT DOCUMENTS

| 5,873,081 | A | 2/1999 | Harel |
| 6,859,807 | B1 | 2/2005 | Knight et al. |
| 7,188,168 | B1 | 3/2007 | Liao |
| 7,277,885 | B2 | 10/2007 | Eppley et al. |
| 8,504,579 | B1 * | 8/2013 | Broekhuijsen .... G06F 17/30961 707/754 |
| 2004/0039786 | A1 | 2/2004 | Horvitz et al. |
| 2004/0078779 | A1 | 4/2004 | Dutt et al. |

(Continued)

FOREIGN PATENT DOCUMENTS

EP 1462950 A1 9/2004

OTHER PUBLICATIONS

Akuda Labs LLC, International Preliminary Report on Patentability, PCTUS2014/029759, Sep. 15, 2015, 12 pgs.

(Continued)

*Primary Examiner* — Hares Jami
(74) *Attorney, Agent, or Firm* — Morgan, Lewis & Bockius LLP

(57) ABSTRACT

A computer system identifies high-value information in data streams. The computer system receives a receiving a plurality of data streams. Each of the data streams includes a plurality of posts. Each of the posts includes a content portion and one or more source characteristics, In real time, for each post in a particular data stream: the system assigns the post a post identifier; generates a content packet and one or more source packets; queries memory to access a source profile using a respective source identifier included in the content packet; correlates the content packet with information from the source profile to produce a correlated content packet; and broadcasts the correlated content packet to a plurality of filter graph definitions.

20 Claims, 28 Drawing Sheets

(56) References Cited

U.S. PATENT DOCUMENTS

| | | |
|---|---|---|
| 2005/0080792 A1 | 4/2005 | Ghatare |
| 2005/0114700 A1 | 5/2005 | Barrie et al. |
| 2006/0069872 A1 | 3/2006 | Bouchard et al. |
| 2009/0037350 A1 | 2/2009 | Rudat |
| 2010/0191772 A1 | 7/2010 | Brown et al. |
| 2010/0191773 A1 | 7/2010 | Stefik et al. |
| 2010/0262684 A1 | 10/2010 | Valois |
| 2011/0246485 A1* | 10/2011 | Rinearson ......... G06F 17/30997 707/749 |
| 2012/0117533 A1 | 5/2012 | Hatcherson et al. |
| 2012/0197980 A1* | 8/2012 | Terleski ................ G06Q 50/01 709/203 |
| 2013/0124504 A1 | 5/2013 | Haugen et al. |
| 2013/0268534 A1 | 10/2013 | Mathew et al. |
| 2014/0078887 A1 | 3/2014 | Yu et al. |

OTHER PUBLICATIONS

Akuda Labs LLC, International Search Report and Written Opinion, PCT/US2014/029759, May 29, 2015, 17 pgs.

Akuda Labs LLC, International Search Report and Written Opinion, PCTUS2015/026252, Jul. 31, 2015, 10 pgs.

Anastasiu et al., "Document Clustering: The Next Frontier," UMN-CS&E TR 13-004, Feb. 2013, 20 pgs.

Park et al., "Topic Word Selection for Blogs by Topic Richness Using Web Search Result Clustering," In Proceedings of the 6th International Conference on Ubiquitous Information Management and Communication, No. 80, Feb. 20-22, 2012, 6 pgs.

Stevens, Office Action, U.S. Appl. No. 14/214,490, Jan. 13, 2016, 14 pgs.

Stevens, Office Action, U.S. Appl. No. 14/214,490, Mar. 24, 2016, 11 pgs.

* cited by examiner

MASSIVELY-PARALLEL SYSTEM ARCHITECTURE AND METHOD FOR REAL-TIME EXTRACTION OF HIGH-VALUE INFORMATION FROM DATA STREAMS

RELATED APPLICATIONS

This application claims priority to U.S. Provisional Patent Application No. 61/802,353, filed Mar. 15, 2013, entitled "Extracting High-Value Information from Data Streams," which is incorporated by reference herein in its entirety.

This application is also related to U.S. patent application Ser. No. 14/214,410, filed Mar. 14, 2014, entitled "Hierarchical, Parallel Models for Extracting in Real-Time High-Value Information from Data Streams and System and Method for Creation of Same" and U.S. patent application Ser. No. 14/214,490, filed Mar. 14, 2014, entitled "Optimization for Real-Time, Parallel Execution of Models for Extracting High-Value Information from Data Streams," each of which is incorporated by reference herein in its entirety.

TECHNICAL FIELD

This application relates to extraction of high-value information from streams of data.

BACKGROUND

The growing phenomenon of social media has resulted in a new generation of "influencers." Every day, tens of millions of consumers go online to express opinions, share ideas and publish media for the masses. Consumers control the conversation and play a significant role in shaping, for example, the purchasing decisions of others. Thus, companies have to work harder to manage their reputations and engage consumers in this fluid medium. Business that learn to understand and mine consumer-generated content across blogs, social networks, and forums have the opportunity to leverage the insights from others, make strategic business decisions and drive their bottom line. Social media monitoring is often the first step to adopting and integrating the social Web into business.

The problem with monitoring social media for business (and other) interests is that it difficult to "separate the wheat from the chaff." Conventional tools and methods for monitoring often fail to turn social media data into actionable intelligence. Too often, such methods produce only statistical views of social media data, or produce far more data than a company can react to while missing critical pieces of data. Therefore, what is needed are methods and systems for identifying valuable information, and only valuable information, (e.g., as defined with respect to a particular interest, such as a business interest) in real-time.

SUMMARY

In accordance with some implementations, a method is provided for identifying high-value information in data streams (e.g., in real-time). The method is performed at a computer system including a plurality of processors and memory storing programs for execution by the processors. The computer system receives a plurality of mission definitions. Each of the mission definitions includes a plurality of classification models, each of which is configured to accept or reject individual packets in a data stream based on content and/or metadata information associated with individual posts corresponding to the individual packets. The classification models included in a respective mission definition are combined according to a predefined arrangement so as to identify collectively individual packets with high value information according to the respective mission definition. The computer system prepares the mission definitions for execution on the plurality of processors. In response to receiving a first data stream with a plurality of first packets, the computer system distributes each of the first packets to inputs of each of the executable mission definitions. The computer system identifies, using each of the executable mission definitions, respective ones of the first packets with high value information according to the respective mission definition, based on parallel execution of the models included in the respective mission definition.

In accordance with some implementations, a computer system is provided for identifying high-value information in data streams. The computer system includes a plurality of processors and memory storing one or more programs to be executed by the plurality of processors. The one or more programs include instructions for receiving a plurality of mission definitions. Each of the mission definitions includes a plurality of classification models, each of which is configured to accept or reject individual packets in a data stream based on content and/or metadata information associated with individual posts corresponding to the individual packets. The classification models included in a respective mission definition are combined according to a predefined arrangement so as to identify collectively individual packets with high value information according to the respective mission definition. The one or more program also include instructions for preparing the mission definitions for execution on the plurality of processors and in response to receiving a first data stream with a plurality of first packets, distributing each of the first packets to inputs of each of the executable mission definitions. The one or more programs also include instructions for identify, using each of the executable mission definitions, respective ones of the first packets with high value information according to the respective mission definition, based on parallel execution of the models included in the respective mission definition.

In accordance with some implementations, a non-transitory computer readable storage medium is provided storing one or more programs configured for execution by a computer system. The one or more programs include instructions for receiving a plurality of mission definitions. Each of the mission definitions includes a plurality of classification models, each of which is configured to accept or reject individual packets in a data stream based on content and/or metadata information associated with individual posts corresponding to the individual packets. The classification models included in a respective mission definition are combined according to a predefined arrangement so as to identify collectively individual packets with high value information according to the respective mission definition. The one or more programs also include instructions for preparing the mission definitions for execution on the plurality of processors and, in response to receiving a first data stream with a plurality of first packets, distributing each of the first packets to inputs of each of the executable mission definitions. The one or more programs also include instructions for identify, using each of the executable mission definitions, respective ones of the first packets with high value information according to the respective mission definition, based on parallel execution of the models included in the respective mission definition.

DETAILED DESCRIPTION

Figure 1:
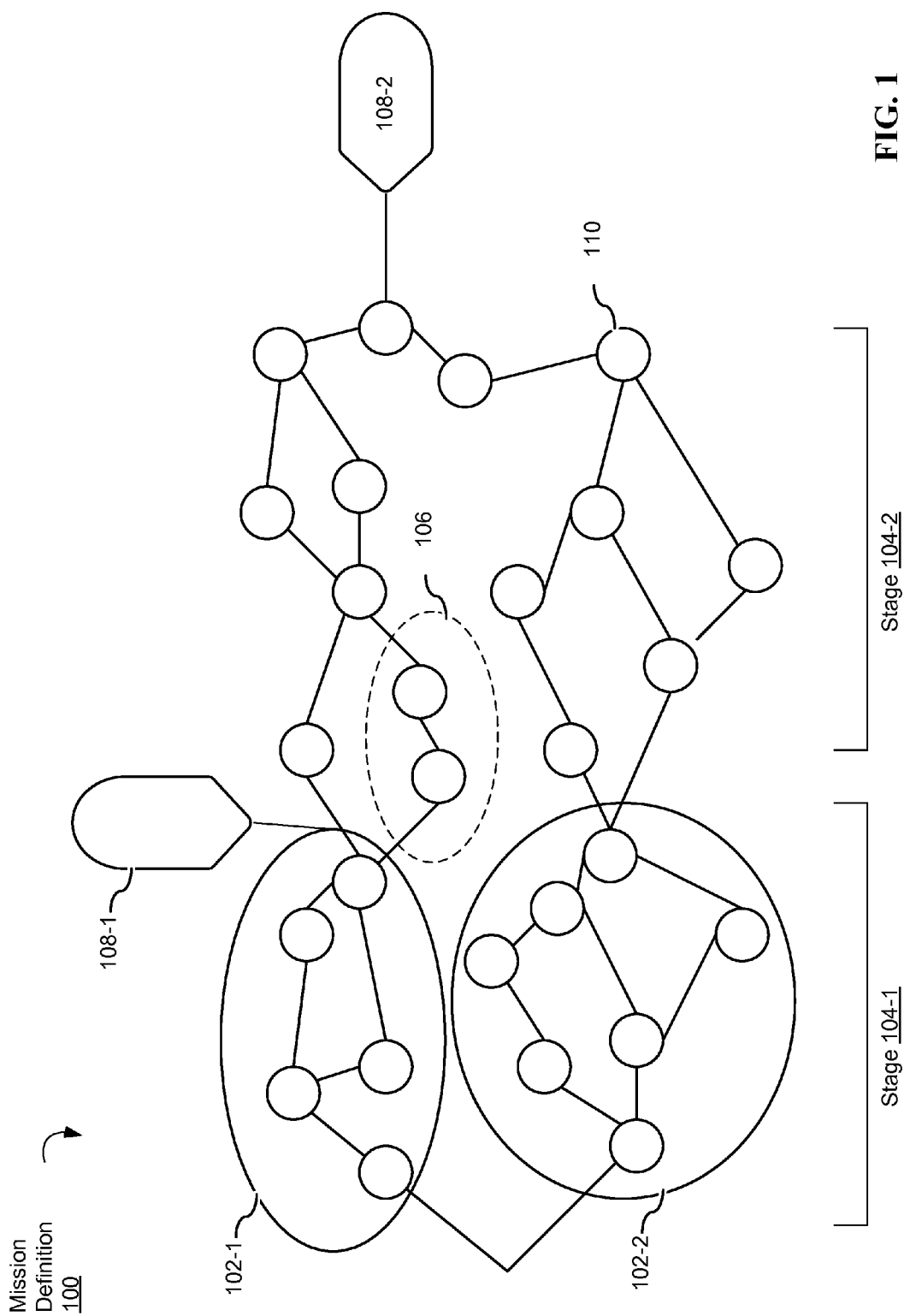
FIG. 1 illustrates a general graph representing a mission definition, in accordance with some implementations.

Hierarchical, Parallel Models for Extracting in Real Time High-Value Information from Data Streams and System and Method for Creation of Same FIG. 1 illustrates a general graph representing a mission definition 100. A mission definition is a specification (e.g., a computer file or a data structure) describing one or more filters (represented as filter nodes 110 in FIG. 1) and the relationships (e.g., connections, or "graph edges") between the filters (e.g., filter nodes, sometimes called "classification models) that together form the general graph (e.g., in some circumstances, a mission definition is referred to as a "filter graph"). Mission definitions are compiled into executable mission definitions and executed against data streams that include a plurality of posts to produce a filtering network classification stream (e.g., a stream of packets, each corresponding to a particular post and classified as to whether the post includes high-value information).

As described in greater detail below, posts can include any type of information update that is received over a network. For example, in some embodiments, posts include Twitter Tweets, Facebook posts, online forum comments, Youtube videos, and the like. Alternatively, in some embodiments, posts can include updates from smart thermostats, smart utility meters, information from a mobile device (e.g., a smart-phone, Fitbit device, etc.). In some implementations, posts are parsed into content portions, which are sometimes referred to herein as a "snippets." For example, a user's online car forum post can be parsed into a snippet that includes the text within the post (e.g., "So happy with my new car!").

In some implementations, a mission definition (e.g., a filter graph) comprises one or more filters (e.g., filter nodes of the filter graph). In some implementations, filters are regular expressions that are converted to finite state automata such as deterministic finite automata (DFAs) or non-deterministic automata (NDAs)

In some implementations, a mission definition (e.g., filter graph) comprises one or more models (e.g., model 102). In some implementations, models comprise one or more filters that, collectively, represent a concept. For example, in some circumstances, a model represents "Happy Customers" and is therefore designed to answer the question, "Does a particular piece of information (e.g., a post from a data source) represent, or originate from, a happy customer?" As an example, to extract information corresponding to happy customers of a particular brand, a mission definition will include a concatenation of a generic "Happy Customers" model with a model for the particular brand.

In some circumstances, it is heuristically useful to refer to blocks rather than models. The term "block" is used to mean a sub-graph of one or more filters and their relationship to one another. It should be understood that the distinction between blocks and models is arbitrary. However, for heuristic purposes, the term "model" is used to refer to one or more filters that represent a particular concept whereas the term "block" is used to describe procedures for optimizing the graph (e.g., combining blocks) during parallelization and compilation.

In some implementations, a mission definition includes one or more stages 104. Each stage of the one or more stages 104 represents a successive level of refinement. For example, a mission definition for a car manufacturer optionally includes the following stages: (i) a "broad listening" stage utilizing a "Car" model and a "Truck" model (e.g., in a Boolean 'OR' such that the broad listening stage accepts snippets related to cars OR trucks), (ii) a brand refinement stage (or a medium accept stage) utilizing a brand specific model, and (iii) a product refinement stage (e.g., a fine accept stage) utilizing models generated for particular products offered by the brand. In addition, the mission definition for the car manufacturer optionally includes one or several reject stages (e.g., a medium reject stage, a fine reject stage, etc.) For example, a medium reject stage for a hypothetical brand Katandin Wool Products may include a medium reject stage that rejects snippets relating to Mount Katandin in Maine.

In some implementations, a mission definition 100 includes one or more taps 108. Taps 108 are leaf nodes in the mission definition used for accessing any level of refinement of the filtering network classification stream (e.g., in some embodiments, taps produce an output to other aspects of the computer ecosystem). Taps 108 are inserted into a mission definition 100 to generate additional analytics data from the stream output. The analytics data is then accessible to the additional components of the system (e.g., Stream Analytics Charts, Deep Inspection, and Topic Discovery systems, described later in this document). Taps 108 reduce system complexity and resource utilization by allowing a stream to be partitioned into multiple branches, which can be processed in parallel. This also permits common operations, such as broad concept matching and noise filtering, to be performed once rather than repeated across multiple streams. Stream data may then be refined downstream by specific filters and tapped at desired access points.

For convenience of understanding, a portion of a mission definition 100 that reaches a respective tap is considered a sub-mission definition. Likewise, although each model includes one or more filters 110, in some embodiments, models 110 are concatenated or otherwise arranged with relationships relative to one another in the general graph to form larger models (e.g., parent models). It should be understood, however, that whether an element described herein is referred to as a "filter," "model," "block," "sub-mission definition," or "stage" is purely a matter of convenience of explanation. Such terms can apply interchangeably to processing elements at different hierarchical levels of a mission definition.

Figure 2:
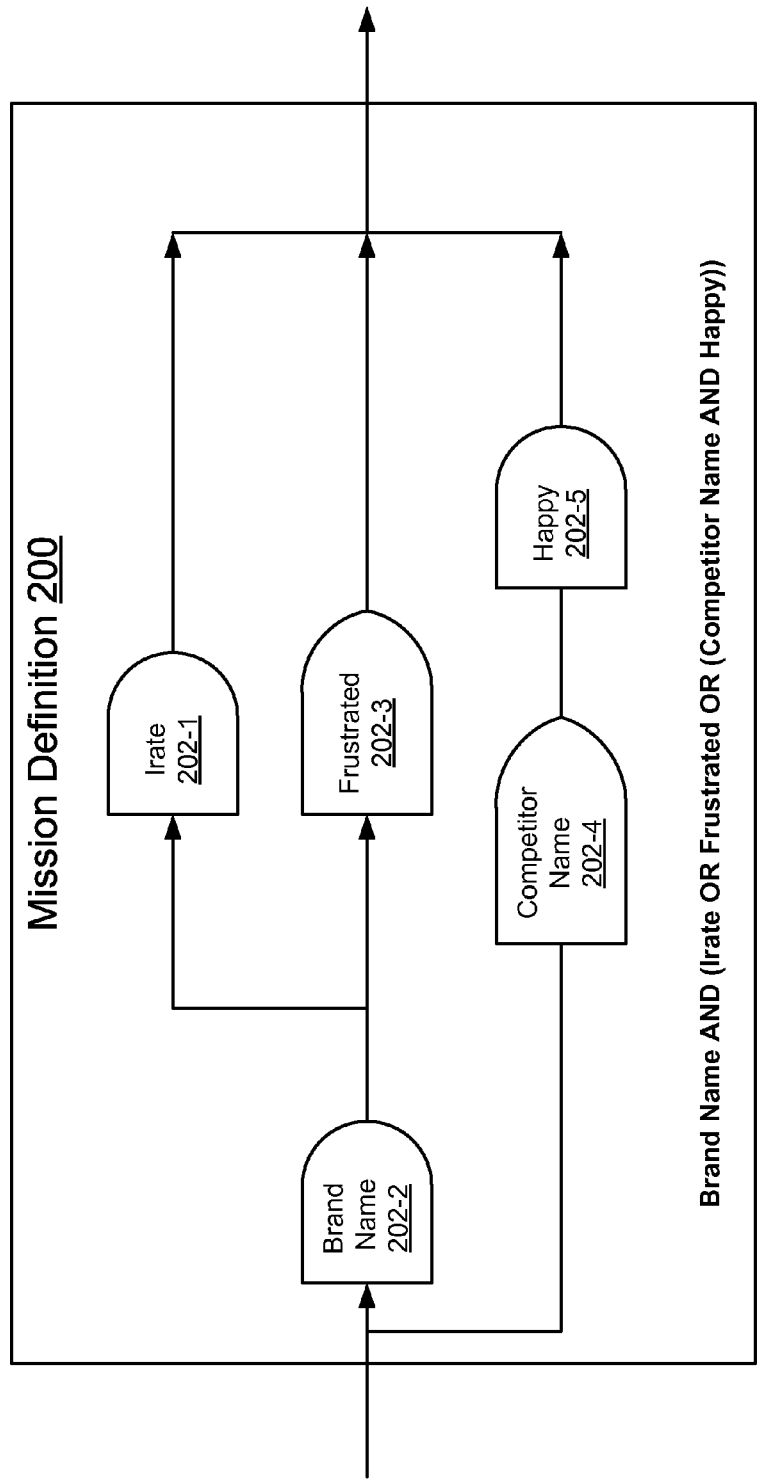
FIG. 2 illustrates an example mission definition, in accordance with some implementations.

FIG. 2 illustrates an example mission definition 200 (e.g., a filter graph). The mission definition 200 (e.g., filter graph) includes several classification models 202 (e.g., filter nodes). Each classification model 202 includes one or more filters that, together, embody a concept. For example, classification model 202-1 indicates whether a respective post represents an "irate" person; classification model 202-2 indicates whether a respective post pertains to a particular brand name (e.g., Chevrolet, Pepsi); classification model 202-3 senses whether the post represents a frustrated person; classification model 202-4 indicates whether a post pertains to a particular competitor's name (e.g., if brand name classification model 202-2 corresponds to "Chevrolet," competitor name classification model 202-4 may correspond to "Ford"); and classification model 202-5 indicates whether a respective post represents a happy person.

When a classification model 202 receives a post, the system (e.g., the processors) executing the mission definition determine whether the post meets predefined criteria with respect to the classification model 202 so as to be "accepted" by the classification model 202. When a post is accepted by the classification model 202, in some embodiments, the post progresses further downstream in the mission definition (e.g., when the mission definition is embodied as a directed filter graph, the post follows the direction of the filter edges to the next classification model 202). In some embodiments, when the post is accepted, the post is tagged (e.g., in a corresponding data structure) with an identifier of the classification model 202. In some embodiments, when the post is not accepted (e.g., is rejected) by classification model 202, the system forgoes tagging the post with the identifier. In some embodiments, when the post is not accepted, the system removes the post from the mission definition 200 (e.g., the post no longer progresses through the filter graph).

In some embodiments (although not shown), a classification model 202 is a reject filter, which can be represented by including a logical "NOT" in the specification for the classification model 202. For example, by including a logical "NOT" in the specification for classification model 202-1, the system will reject all post corresponding to irate persons. In some embodiments, when a post is rejected by a reject filter, it is tagged as rejected with an identifier of the reject classification model 202. In some embodiments, when a post is not rejected (e.g., is accepted) by a reject classification model 202, it is not tagged (e.g., the system forgoes tagging the post). In some embodiments, when a post is rejected, it is removed from the mission definition 200. In some embodiments, the post continues to progress through the mission definition 200 regardless of whether it was rejected or not. By tagging rejected posts as rejected and allowing the posts to continue through the mission definition, more information is available for future analytics.

Classification models 202 (e.g., filter nodes) that occur on parallel branches of the mission definition 200 represent a logical "OR" relationship between the classification model. Classification models 202 that occur in series represent a logical "AND" relationship between the classification models.

In some embodiments, a post is "matched" to the mission definition 200 if the post proceeds all the way through the mission definition 200 using at least one path through the mission definition 200 (e.g., is accepted by all of the accept classification models along the at least one path and is not rejected by all of the reject models along the at least one path).

In this manner, the mission definition 200 is designed to determine when a post indicates that its author is either frustrated or irate with a particular brand (e.g., according to the path corresponding to Brand Name Model AND [Irate OR Frustrated]) or alternatively, whether a post indicates that its author is happy with a competitor (e.g., according to the path corresponding to a Competitor Name AND Happy). In this example, the mission definition 200 produces high-value information to a company owning the particular brand because in either case (e.g., whether a post was accepted through either path or both), the company will be able to intervene to limit the spread of information that is harmful to the company's reputation.

Figure 3:
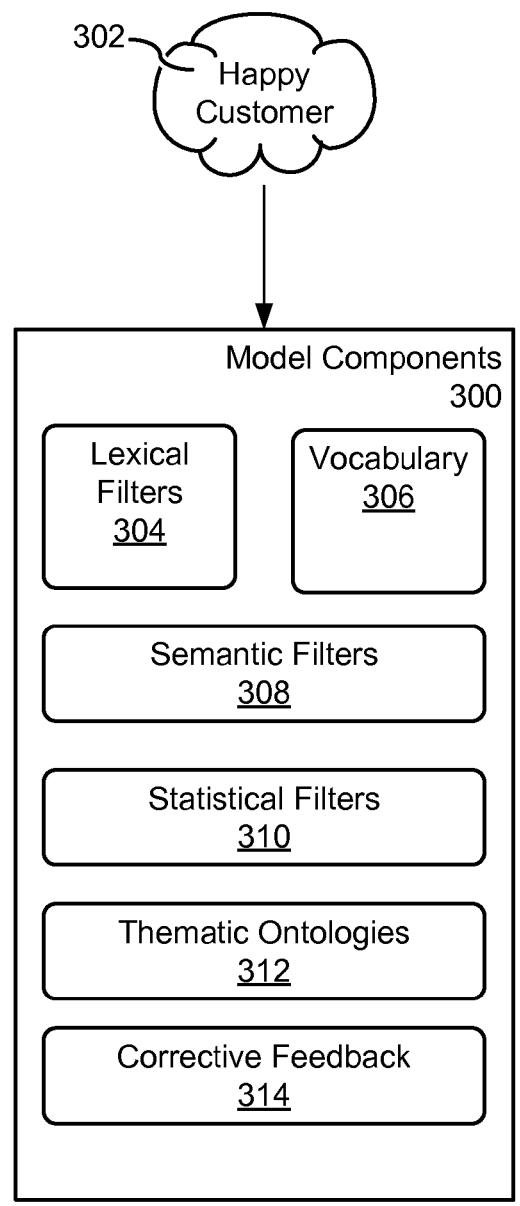
FIG. 3 illustrates example components of a model for "Happy Customers," in accordance with some implementations

FIG. 3 illustrates example components of an example model 302 for "Happy Customers." In some implementations, the model includes one or more of the group consisting of: lexical filters 304, vocabulary filters 306, semantic filters 308, statistical filters 310, thematic ontologies 312 and corrective feedback 314.

Figure 4:
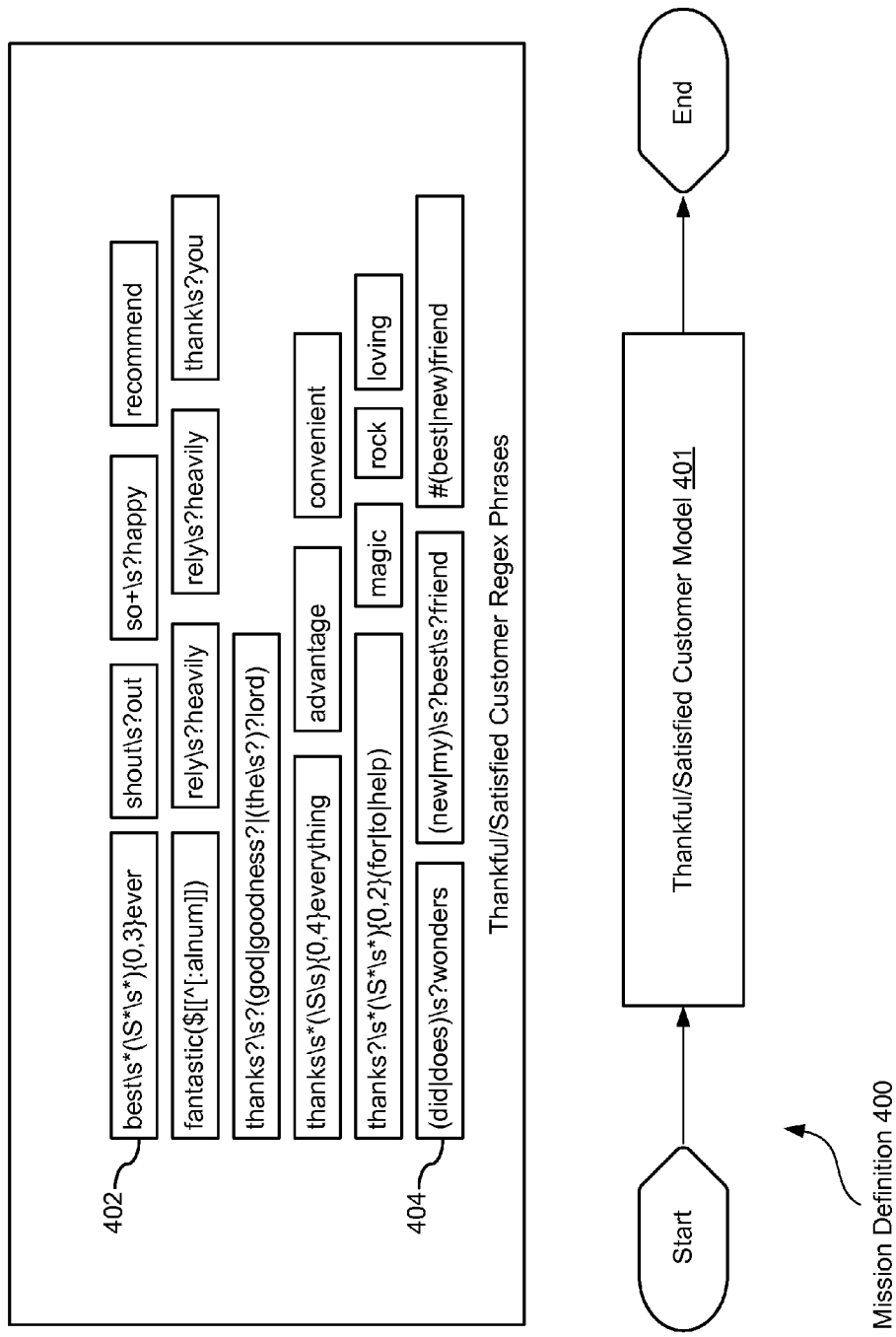
FIG. 4 illustrates a "Thankful/Satisfied" customer model, in accordance with some implementations.

FIG. 4 illustrates a simple mission definition 400 including a single model 401. In this example, the model 401 is a model for "thankful/satisfied" customers, which classifies posts according to whether they represent a generically (e.g., without regard to a particular brand) thankful or satisfied customer. The model 401 includes a plurality of filters embodied as regular expressions, such as the regular expression 402, which accepts phrases such as "Best Car Wash Ever," "Best Burger Ever," and "Best Movie I Have Ever Seen." The model also includes regular expression 404, which accepts phrases such as "XCleaner does wonders!" and "That lip balm did wonders for me!").

Figure 5A:
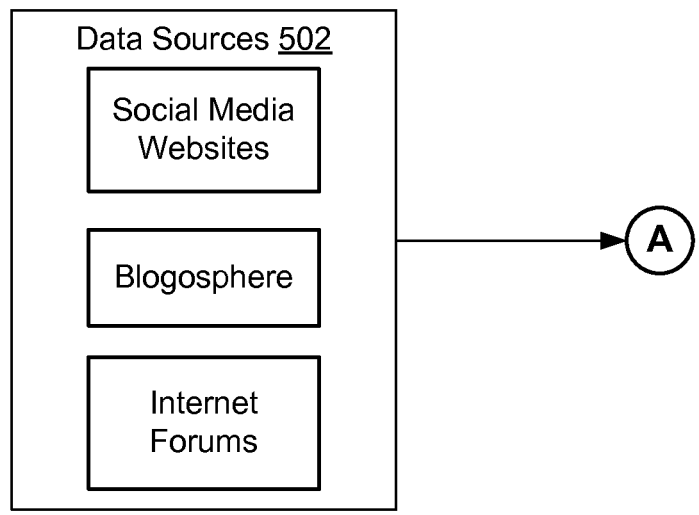
FIGS. 5A-5B illustrates a schematic representation of a massively-parallel computer system for real-time extraction of high-value information from data streams, in accordance with some implementations.
Figure 5B:
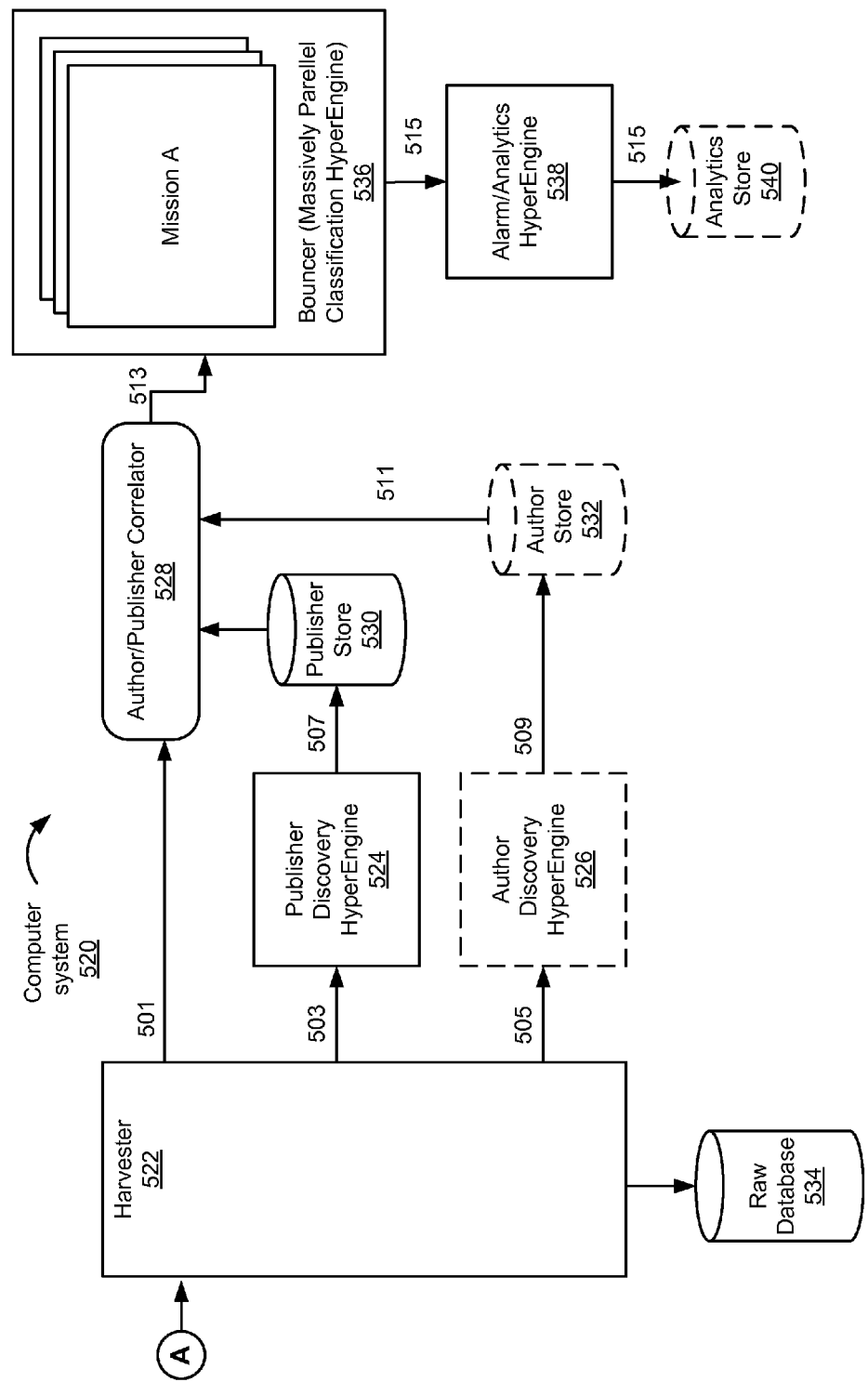

Massively-Parallel System Architecture and Method for Real-Time Extraction of High-Value Information from Data Streams FIGS. 5A-5B illustrate a data environment that includes data sources 402 and a schematic representation of a massively-parallel computer system 520 for real-time extraction of information satisfying one or more mission definitions (e.g., filter graphs), which may be of high value for a user of the system (hereinafter referred to as "high-value information") from data streams, according to some implementations. System 520 includes a Harvester 522. Harvester 522 collects posts (e.g., data) from multiple Data Sources 502 (see FIG. 5A) such as social media websites, internet forums that host conversation threads, blogs, news sources, etc. In some implementations, the posts include a content portion and one or more source characteristics, such as an author and/or a publisher. In some implementations, the Data Sources 502 include smart thermostats, gas/electric smart meters, automobiles, or any other source of real-time data. In some implementations, as described below, the Harvester 522 generates one or more packets from each post, including, in some implementations, a content packet (sometimes hereinafter referred to as a "snippet"), a publisher packet and/or an author packet. For example, in some implementations, a post will originate from a social media site or blog, and the corresponding snippet generated by the Harvester 522 includes the text and/or title of post, the author packet includes a name of the person who wrote the post, and the publisher packet includes the site or blog from which the post originated.

In some implementations, collected posts are indexed and stored upon harvesting (e.g., in real-time) so that full-data searches can be executed quickly (e.g., in Raw Database 534). In some implementations, the collected posts are indexed and stored in near real-time. Because data comes in many different formats (e.g., from the various data sources 502), in some implementations, the Harvester 522 performs an initial normalization of each post. In some implementations, this initial normalization includes identifying the content (e.g., the text of a social media post), the author, and the publisher. In some implementations, the normalized data is divided and sent down three paths: a snippet path 501, a publisher path 503, and an author path 505. In some implementations, all of the collected data corresponding to a respective post is passed down each of the three paths 501, 503, 505. In some implementations, a distinct subset of the collected data is passed down each of the three paths (e.g., a first subset is passed down the snippet path 501, a second subset is passed down publisher path 503, and a third subset is passed down author path 505).

Data passed down the publisher path 503 is provided to a Publisher Discovery HyperEngine 524 for inspection of the data in order to develop a publisher profile. Alternatively, in the event that a publisher profile already exists for a respective publisher, the inspection result of the data is provided to the Publisher Discovery HyperEngine 524 to refine (e.g., update) the publisher profile. The publisher profile (or alternatively the refined publisher profile) is passed down path 507 and stored in publisher store 530.

Likewise, data passed down the author path 505 is provided to an Author Discovery HyperEngine 526 for inspection of the data in order to develop an author profile. Alternatively, in the event that an author profile already exists for a respective author, the inspection of the data is provided to the Author Discovery HyperEngine 524 to refine (e.g., update) the author profile. The author profile (or alternatively the refined author profile) is then passed down path 509 and stored in author store 532.

In some implementations, the inspection of the collected data during publisher discovery (e.g., by the Publisher Discovery HyperEngine 524) and author discovery (e.g., by Author Discovery HyperEngine 526) may be too time-consuming for achieving real-time processing (e.g., classification) of author and publisher packets. For this reason, each respective snippet is passed via snippet path 501 to an Author/Publisher Correlator 528, which performs real-time data correlation with existing information about the respective snippet's author and publisher (e.g., information obtained by inspection of previous snippets originating from the same author or publisher, but not including information obtain by inspection of the respective snippet, since that would require prohibitively long processing times). For example, at this point information from a well-known author would be associated with a current snippet/post from the same author. Thus, a correlated snippet is produced that includes author/publisher information.

A respective correlated snippet is passed to the Bouncer 536 in which the correlated snippet is compared to one or more high specificity data stream filters (e.g., executable mission definitions), each defined by a set of models, each model including one or more filters. The filters are organized into a general graph that determines what type of data to accept and what type of data to reject based on contents and metadata (such as author/publisher information, demographics, author influences, etc.) associated with the post/snippet.

In some implementations, information about a snippet (whether accepted by any filters or not) is passed to the Alarm/Analytics HyperEngine 538, which determines if and how to deliver messages (e.g., to an end-user) and/or when to issue alarms/alerts. In some implementations, information about those snippets that were accepted by at least one filter is passed to the Alarm/Analytics HyperEngine 538. The Alarm/Analytics HyperEngine 538 generates statistics based on the incoming information and compares the statistics against configurable thresholds and triggers alarms for any violations. Trigger alarms are routed to their designated recipients based on the mission definition's alarm delivery policy (e.g., a customer relationship management system, an e-mail message, a short-message service message, etc.).

For example, in some circumstances, companies often employ employees to make house calls to customers. Such companies have a strong interest in ensuring that such employees are good representatives of the company. Thus, such a company will want to know if a customer complains on an online forum (e.g., Facebook, Twitter) about the representative's behavior during the house call. The company may create a "bad employee" mission, with a pre-defined set of alarms (e.g., an alarm for if a post accuses an employee of drug use, profanity, or the like, during the house call). Each of these alarms triggers an e-mail message to a high-level company executive who can proactively deal with the problem, for example, by disciplining the employee or reaching out to the customer to make amends. Alternatively, or in addition, the alarms correspond in some embodiments to statistical trends. For example, an alarm for a fast food corporation may indicate an unusual number of people complaining online of feeling sick after eating after eating at the corporation's franchises (or at a particular franchise).

Figure 6:
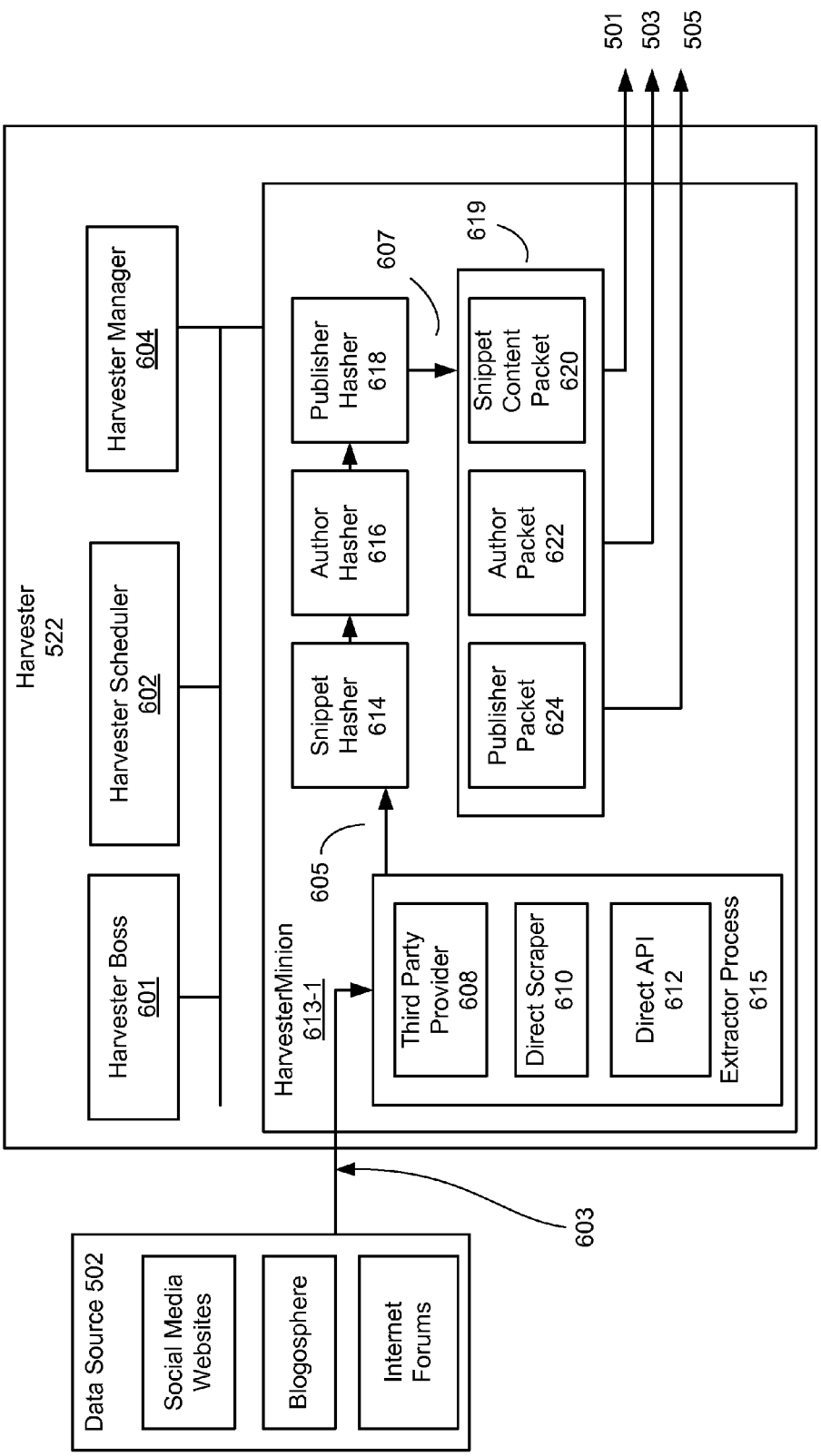
FIG. 6 illustrates a schematic representation of a data harvester, in accordance with some implementations.

FIG. 6 illustrates a schematic representation of the Harvester 522 in greater detail, in accordance with some implementations. In some implementations, the Harvester 522 runs a master harvester process called the Harvester Boss 601. Harvesting operations are performed by one or more servers running Harvester Minion 613 processes. In addition, the Harvester 522 includes a Harvester Scheduler 602 and a Harvester Manager 604. The Harvester Boss 601 passes instructions to the various Harvester Minion 613 processes. As described below, among other operations, the Harvester Minion 613 runs various modules that combine to receive posts from a variety of data sources 502 and generate snippet, author and/or publisher packets corresponding to posts from the data sources 502. Because posts come from a range of sources, the Harvester 522 includes modules 608, 610 and 612 that are configured to interact with the different types of sources. For example, a third party provider module 608 is configured to operate on posts obtained from third party providers 608 (e.g., when the posts are not obtained directly from the source), a direct scraper 610 is configured to directly scrape public information from websites and other internet information resources, and a direct API module 612 is configured to access information from websites through direct APIs provided by those sites. Regardless of the module used harvest a respective post (e.g., the modules 608, 610 and 612), the respective post is passed via path 605 to one or more hashing modules (e.g., snippet hasher 614, author hasher 616, publisher hasher 618) which each perform hashing of a respective post component (e.g., content, author, or publisher information) so as to provide one or more hash-based IDs for snippet, author and publisher information, respectively. The posts, along with the one or more hash-based IDs, are then passed to packetizer 619 which produces one or more of a snippet packet 620, an author packet 622, and a publisher packet 624, which are described in greater detail below.

The different data sources 502 (e.g., social media websites or other sites that provide comprehensive, real-time information streams, or sites such as internet forums that do not provide streaming posts), can be classified according to their respective connection type and dataset completeness. In some implementations, connection types include "continuous real-time stream" and "scheduled API call." Dataset completeness can be "full," indicating all data provided by a connection is collected, and "keyword filtered," indicating only snippets that match at least one keyword in a specified dataset are received.

The Harvester Scheduler 602 periodically checks a timetable of sources stored in memory (e.g., by running a job scheduler such as Cron in UNIX or UNIX-like operating systems). The timetable of sources is used to keep track of the last known time the system has collected data from a particular source (e.g., a particular internet forum). Once a source is due for data harvesting, the source is scheduled into Harvester Boss 601. Harvester Boss 601 locates an available machine by contacting Harvester Manager 604 and passes the source information to a Harvester Minion 613, running on one machine. For ease of explanations, Harvester Minion 613 processes are explained with regard to a single Harvester Minion 613. It should be understood that, in some circumstances, one or more Harvester Minions 613 are running on one or more servers at any given time. Continuous stream-based sources that do not require a periodic API call are scheduled once. Harvester Minion 613 is responsible for maintaining the uptime for these types of stream-based data sources.

Alternatively, for sources with scheduled periodic API calls, Harvester Minion 613 schedules work by spawning as many Extractor Processes 615 as needed to maintain full keyword coverage without overloading the system. The Harvester Minion 613 will also periodically check its available resources and pass that information on to the Harvester Manager 604.

In some implementations, Extractor Processes 615 spawned by Harvester Minion 613 load a relevant extractor code for a respective source (e.g., direct scraper code, or API call code). Thus, in some implementations, system 520 receives a plurality of data streams 603 each corresponding to a respective data source 502 and receives a plurality of posts from each respective data source 502. In some implementations, an Extractor Processes 615 interacts (e.g., using Third Party Provider module 608) with third-party data providers such as SocialMention™, BoardReader™, or MoreOver™. Source codes also optionally utilize one or more direct scrapers 610. For example, in some circumstances, a pharmaceutical company may be interested in monitoring activity on a niche internet forum (e.g., they might want to monitor internet lupus forums in connection with the manufacture of a new lupus treatment). Third-party data providers, however, will often not provide real-time data streams with data from such niche forums. In such circumstances, the Harvester 522 includes a custom scraper that caters to the particular pharmaceutical company's interests. In some implementations, the Harvester 522 includes one or more direct application program interfaces (APIs) 612 provided by respective websites. For example, some social media websites allow users to publish certain data openly. The social media website will often provide API's so that outside developers can access that data.

Each post is extracted by the Harvester 522 via an extractor process spawned by a Harvester Minion 613. The Harvester Minion 613 loads the relevant extractor code for a respective source (e.g., direct scraper code, API call code) when spawning the extractor processes 615. The Harvester 522 receives, via a data stream 603, a raw coded post and the raw coded post is hashed using a hash function (such as a universal unique identifier, or UUID, standard) and backed up in the raw database 534 (FIG. 5). For example, the extractor process decodes an incoming post received from a respective data stream 603 and generates UUIDs for the contents of the post (text and title, Snippet Hasher 614), the author of the post (who wrote the snippet, Author Hasher 616), and the publisher of the post (where the snippet came from, Publisher Hasher 618), respectively. The extractor process 615 generates a plurality of packets corresponding to the post including one or more of: a snippet contents packet, an author packet, and a publisher packet. Packets are encoded using appropriate data structures as described below with reference to FIG. 7. Snippet contents packets are transmitted via the snippet packet channel 501 to other services including the Bouncer 536. Publisher packets are transmitted via publisher packet channel 503 to Publisher Discovery HyperEngine 524 for publisher profile development, as explained below. Author packets are transmitted via author packet channel 505 to Author Discovery HyperEngine 526 for author profile development, as explained below. Packets of a particular type (e.g., snippet contents, author, or publisher) are aggregated such that packets of the same type from different extractor processes on the system are combined into one stream per channel.

Figure 7:
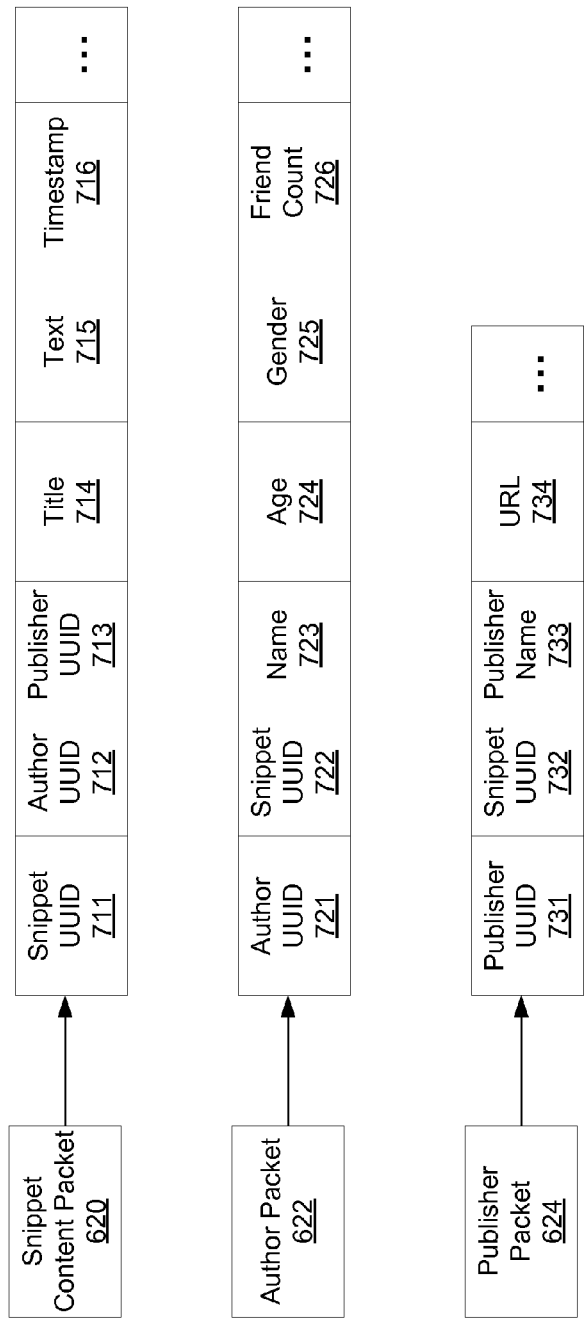
FIG. 7 illustrates example data structures for snippet packets, in accordance with some implementations

FIG. 7 illustrates example data structures for snippet packets 620, author packets 622, and publisher packets 624. Snippet packets 620 include a field for a hash key created by Snippet Hasher 614 for the snippet (Snippet UUID 711), a hash key created by Author Hasher 616 for the author of the snippet (Author UUID 712), and a hash key created by Publisher Hasher 618 for the publisher of the snippet (Publisher UUID 713). Author UUID 712 and Publisher UUID 713 are used by Author/Publisher Correlator 528 (FIG. 1) to associate other information about the author and publisher with the snippet in real-time, including an author's job, gender, location, ethnicity, education, and job status. Snippet packet 620 also optionally includes a title 714, text 715 (e.g., if the snippet corresponds to a social media post), and a timestamp 716, as well as other fields. Author packet 622 includes Author UUID 721, Snippet UUID 722 (e.g., through which the system can retrieve the snippet and corresponding author profile during deep author inspection by Author Discovery HyperEngine 524, FIG. 1). Author packet 622 optionally includes other fields containing information that can be garnered from the original post, such as a name 723 of the author, an age 724, a gender 725, and a friend count 726 (or a follower count or the like). Publisher packet 624 includes publisher UUID 731, snippet UUID 732 (e.g., which is used for later deep author inspection by Publisher Discovery HyperEngine 526, FIG. 1). Publisher packet 624 optionally includes other fields containing information that can be garnered from the original snippet, such as a publisher name 733, a URL 734 and the like. These data structures are optionally implemented as JavaScript Object Notation (JSON) encoded strings.

Snippet packets 620 are passed via path 501 (FIG. 5) from Harvester 522 to Author/Publisher Correlator 528 for author publisher/correlation, as described in greater detail with reference to FIG. 8.

Figure 8:
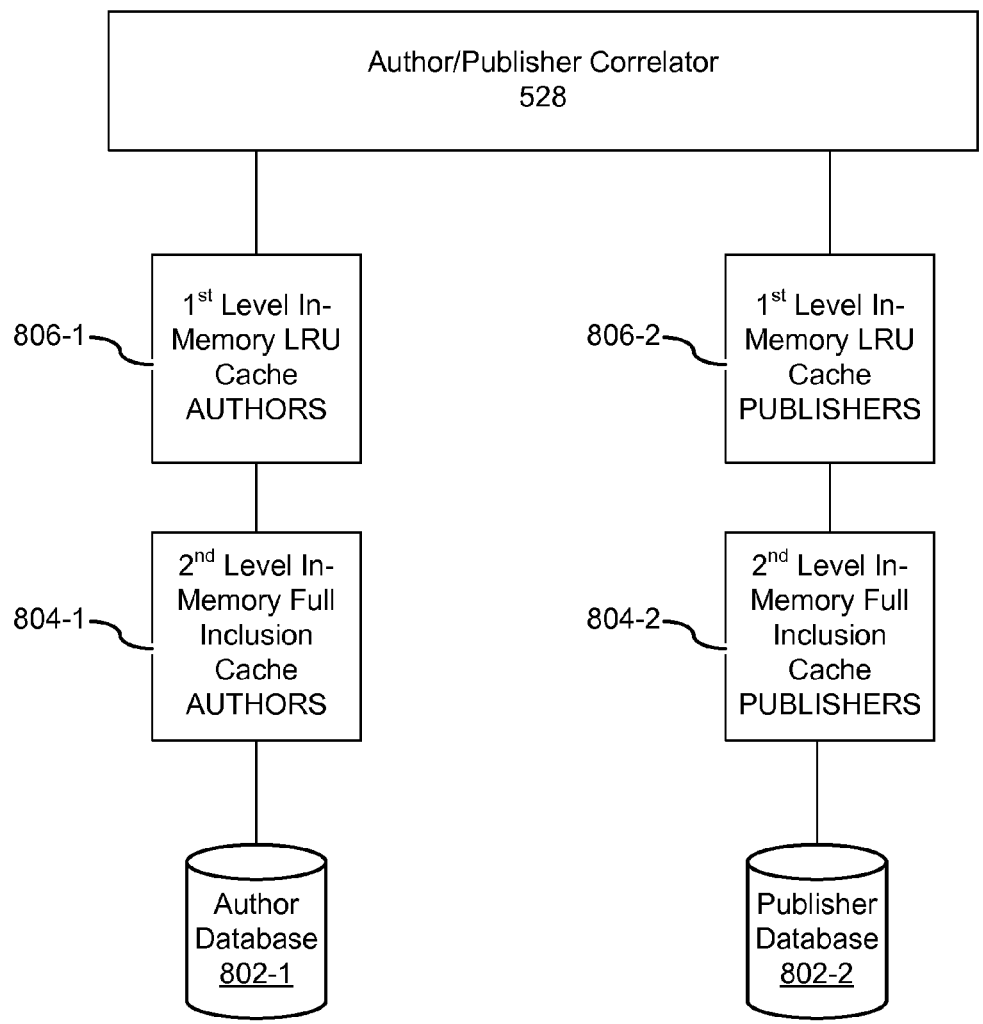
FIG. 8 illustrates an architecture for achieving fast author/publisher correlation, in accordance with some implementations.

FIG. 8 illustrates a memory architecture for achieving fast author/publisher correlation. Snippet packets are processed by the Bouncer 536 (FIG. 5B) according to their associated publisher and author information (including demographics), in addition to snippet content. To execute filters requiring this additional information while keeping the filtering process scalable and execution times meeting real-time requirements (e.g., on the order of 50 milliseconds), Author/Publisher Correlator 528 quickly (e.g., in real-time) correlates snippets with previously known data about their publishers and authors. A 3-level storage system is used to accomplish this fast correlation procedure. All author and publisher information is stored in a highly scalable data base system 802 (3rd level). All data is also pushed into an in-memory cache 804 (2nd level) that contains a full mirror of the author/publisher information. Lastly, the correlation processors maintain a least recently used (LRU) first level cache 806 in their own memory address space (1st level). For example, when a snippet is received, the Author/Publisher Correlator 528 performs a lookup operation attempting to access the snippet from the first level author cache 806-1 using the Authors UUID 721 as a hash key. When the lookup operation returns a cache miss, first level author cache 806-1 transmits the request to the second level author cache 804-1. When the lookup operation returns a cache miss at the second level author cache 804-1, the request is forward to author database 802-1, where it is read from disk.

Referring again to FIG. 5B, correlated snippet packets 513 are passed to the Bouncer 536 for processing. In some implementations, the processing in the Bouncer 536 includes parallel execution of multiple mission definitions (e.g., filter graphs) on every snippet packet 513 that is passed to the Bouncer 536. Efficient distribution of processing required by each mission definition (e.g., distribution to respective processors of the classification filters that are executed to classify, accept and/or reject the posts/snippet packets 513) enable the classification system 520 to process enormous numbers of posts per minute.

Figure 9:
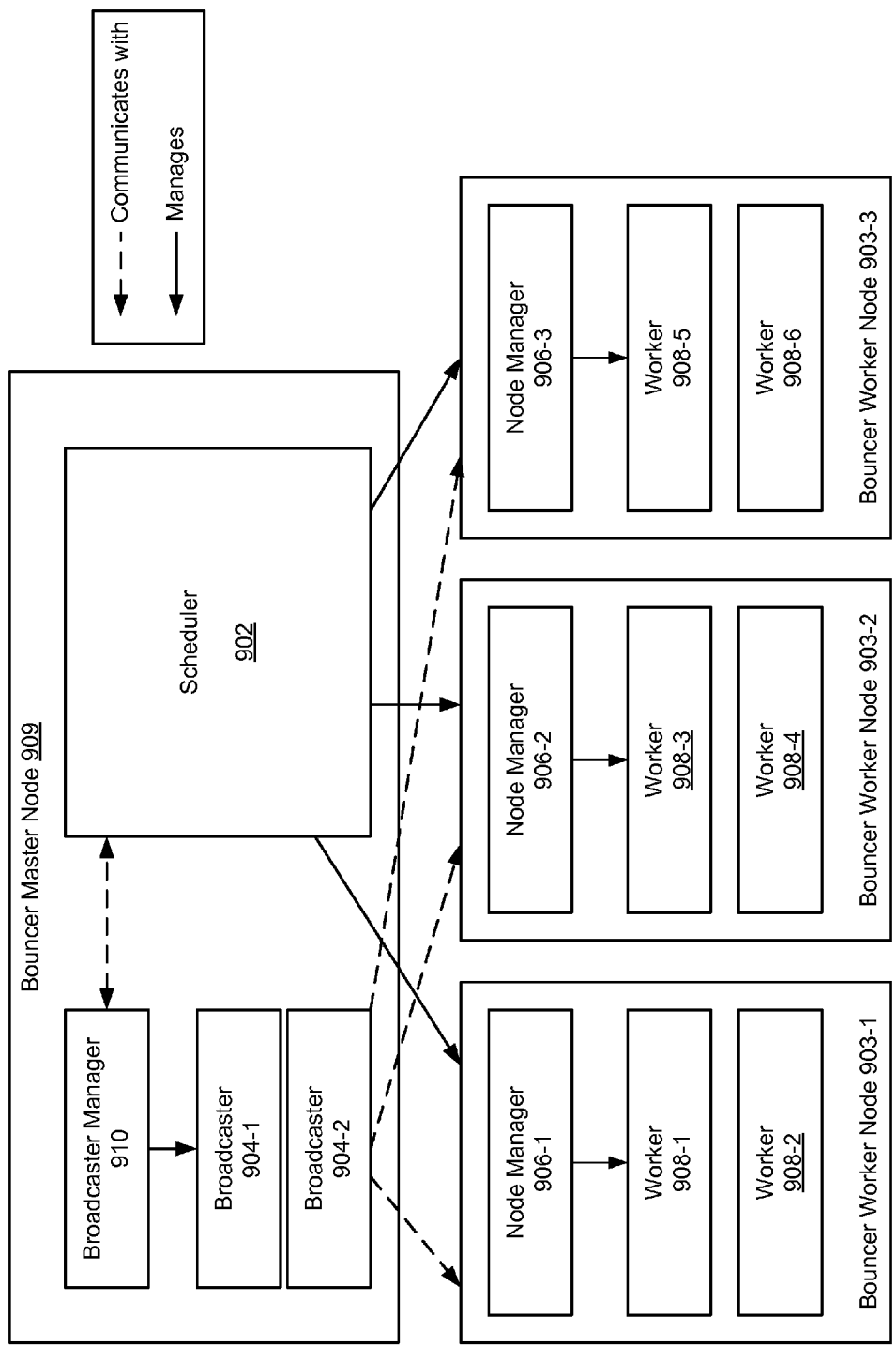
FIG. 9 illustrates a massively parallel classification (e.g., filtering) system, in accordance with some implementations

FIG. 9 illustrates Bouncer 536 in greater detail. Bouncer 536 is a real-time massively parallel classification (filtering) system. The filtering specification is specified via a set of regular expressions encapsulated in an object called a mission definition (as described above in greater detail, e.g., with reference to FIG. 1 and FIG. 2). A mission definition is a high specificity data stream filter network defined by a set of filtering "models," and taps (e.g., leaf nodes) organized in a general graph that defines what type of data to accept and what type of data to reject, based on content and metadata, including information such as publisher, author, author demographics, author influence. Filters within a model are converted to finite state automata such as deterministic finite automata (DFAs) or non-deterministic automata (NDAs), and automatically parallelized and executed on multiple processing engines. The filtered data stream can be delivered to one or more destinations of various types, including, but not limited to, customer relationship management (CRM) systems, web consoles, electronic mail messages and short message service (SMS) messages.

As shown in FIG. 9, the Bouncer 536 is divided into four main components: a Scheduler 902, one or more Broadcasters 904, one or more NodeManagers 906 and one or more Workers 908. The Scheduler 902, Broadcasters 904, and an additional Broadcaster Manager 910 run on a master machine called Bouncer Master Node 909. NodeManagers 906 and Workers 908 run on slave machines called Bouncer Worker Nodes 903. Broadcaster Manager 910 manages and monitors the individual Broadcasters 904. Broadcasters 904 receive snippets from Harvester 522. Broadcasters 904 transmit the received snippets to Workers 908 and Workers 908 determine which mission definitions (e.g., filter graphs) accept those snippets. Scheduler 902 and NodeManagers 906 manage the execution of Workers 908 and update them as the mission definition descriptions change. All interprocess communication in Bouncer 536 is accomplished through a dedicated queue manager.

Figure 10:
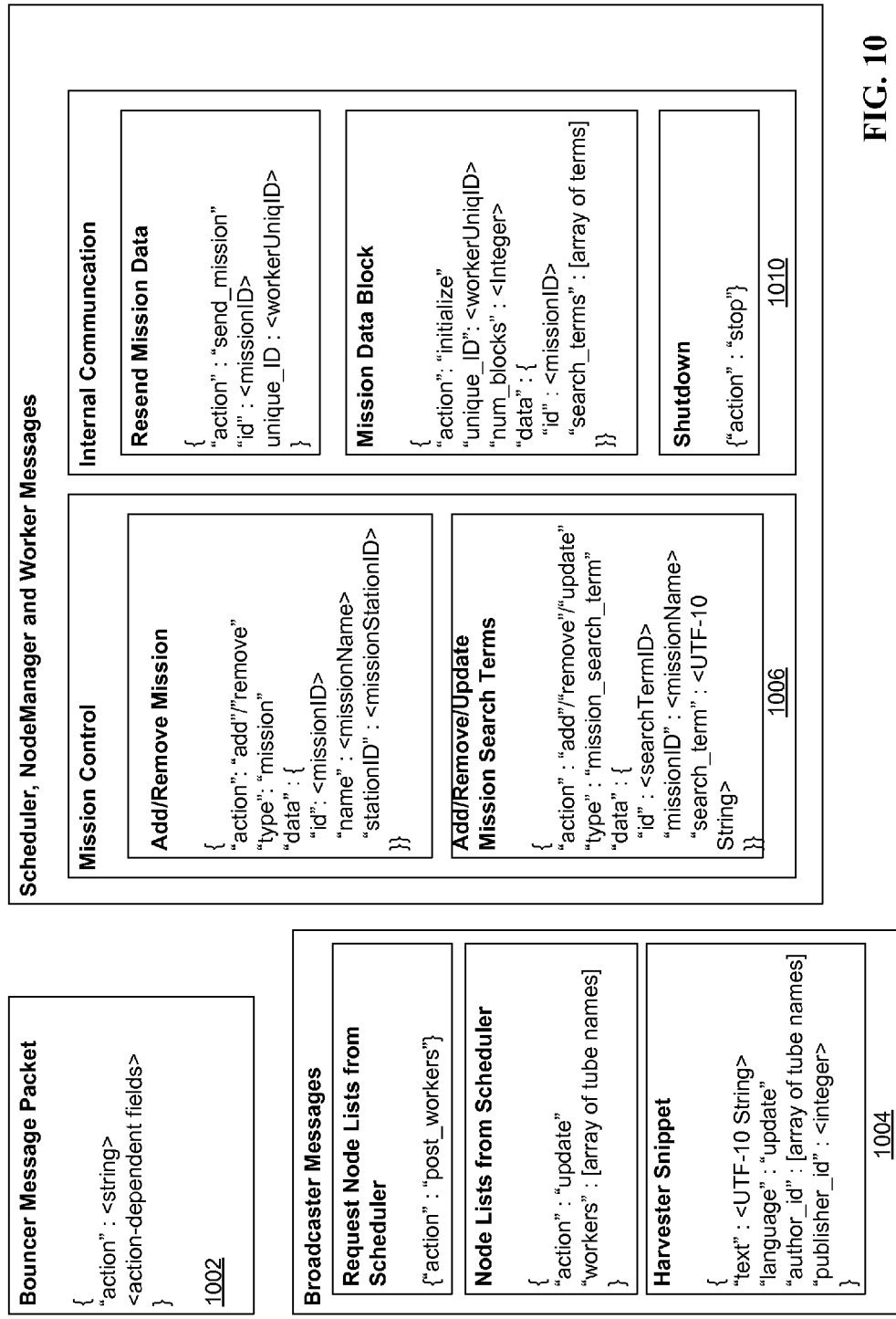
FIG. 10 illustrates example data structures for messages within the massively parallel classification (e.g., filtering) system, in accordance with some implementations.

FIG. 10 illustrates example data structures for Bouncer Message Packets 1002. In some implementations, messages in Bouncer 536 are JSON-encoded strings. Messages have an "action" field that tells a receiving process (e.g., a worker 908) what to do with it. For example, possible values for the "action" field include: "add," "remove," "update," "send_mission definition," "initialize," or "stop." Messages also have a "type" field. Possible values for the "type" field include "mission definition" and "mission definition_search_term." The data fields vary depending on the type. For example, several example structures (e.g., specific examples of Bouncer Message Packets 1002) for broadcaster messages 1004, mission definition control message 1006, and internal communication message 1008 are shown in detail in FIG. 10. Broadcaster messages 1004 include snippets. Mission definition control messages 1006 include message that add and remove mission definitions, and messages that add and remove search terms from a particular mission definition (e.g., filter graph). Internal communication messages 1010 include messages requesting that the Bouncer Master Node 1010 resend mission definition data, or shutdown a mission definition altogether.

The Scheduler 902 is the master process of the bouncer system. Scheduler 902 receives data about the mission definitions from a compiler (which is discussed in more detail with reference to FIG. 15). Scheduler 902 stores the data an internal hash table. When a particular worker 908 or NodeManager 906 fails, the scheduler 902 resends the relevant mission definition data using the internal hash, so as not to interact with the compiler more than necessary. Scheduler 902 also manages a list of machines performing the regular expression matching.

Referring again to FIG. 9, when the Scheduler 902 needs to use a machine for regular expression matching, it spawns a NodeManager 906 process to manage all workers on that machine. Whenever Scheduler 902 receives an update from the Broadcaster Monitor telling it to create a new mission definition, it forwards that update message to a respective NodeManager 906. Any future updates to that mission definition are also forwarded to the respective NodeManager 906.

When a NodeManager 906 is added to Bouncer 536, Scheduler 902 notifies Broadcaster Manager 910 so it can start broadcasting to Bouncer Worker Node 903 corresponding to the NodeManager 906. Alternatively, whenever a NodeManager 906 is removed from Bouncer 536, Scheduler notifies Broadcaster Manager 910 so it can stop broadcasting to Bouncer Worker Node 903 corresponding to the NodeManager 906. If Scheduler 902 receives an update that it cannot currently process (such as adding a search term to a mission definition that does not yet exist), Scheduler 902 places the update in a queue, and will attempt to handle it later. This allows messages that are received out-of-order to be roughly handled in the correct order. Messages that cannot be handled in a specified amount of time are deleted.

Broadcasters 904 are the connection between Bouncer 536 and Harvester 522. Broadcasters 904 receive snippets from the Harvester 522, and broadcast them to each Bouncer Worker Node 903 via a NodeManager 906. Scheduler 904 sends a list of NodeManagers 906 to Broadcaster Manager 910, who manages all the broadcaster processes that are running in parallel. In order to decrease the load on an individual broadcaster, the number of broadcaster processes is dynamically changed to be proportional to the number of NodeManagers 906. Broadcaster Manager 910 ensures that at least a desired number of broadcasters are running on Bouncer Master Mode 909 at a given moment, restarting them if necessary.

Broadcaster performance affects the overall performance of Bouncer 536. If the Broadcaster 904 cannot send snippets as fast as it receives them, the latency of the system increases. To avoid this, Harvester 522 manages snippet traffic as to not put too much load on any one individual Broadcaster 904. This is accomplished by making Harvester 522 aware of the current number of broadcaster processes in Bouncer 536, and having Harvester 522 send each snippet to a randomly selected broadcaster 904.

The Bouncer 536 needs to scale well as the number of mission definitions (e.g., filter graphs) increases. In implementations in which Broadcasters 904 communicate directly with Workers 906, the number of connections required is O(NM) where N is the number of mission definitions and M is the number of Broadcasters 904 (since each Broadcaster 904 must have a connection to each Worker 908). This will quickly surpass the maximum connection limit of a typical server running a fast work queue (such as a Beanstalk'd queue or an open source alternative). Thus, it is preferable to introduce an extra layer between Workers 908 and Broadcasters 904. In some implementations, the NodeManager 906 has one instance on each Bouncer Worker Node 903 in the Bouncer 536, and acts like a local broadcaster. The Broadcasters 904 then only need to broadcast to all Node-Managers 906 (of which there are far less than the number of mission definitions). The NodeManager 906 can then broadcast to the local Workers 908 using the local queues, which are much more efficient than global distributed queues when in a local context.

In some implementations, Bouncer 536 includes a plurality of Bouncer Worker Nodes 903. Each Bouncer Worker Node 903 is a machine (e.g., a physical machine or a virtual machine). Each Bouncer Worker Node 903 runs a single instance of a NodeManager 906 process, which is responsible for handling all the worker processes on that machine. It responds to "add" and "remove" messages from Scheduler 902, which cause it to start/stop the worker processes, respectively. For example, the NodeManager 906 starts a worker 908 when it receives an "add" message from its Scheduler 902. The worker 908 can be stopped when NodeManager 906 receives a message with the "stop" action. When a mission definition's search terms are updated, Scheduler 902 sends a message to the appropriate NodeManager 906, which then forwards the message to the appropriate Worker 908. Unlike Scheduler 902 and Workers 908, NodeManager 906 does not maintain an internal copy of the mission definition data, since its purpose is to forward updates from Scheduler 902 to Workers 908. It also routinely checks the status of Workers 908. If one of its Workers 908 has failed, NodeManager 906 restarts the Worker 908 and tells Scheduler 902 to resend its mission definition data.

Figure 11A:
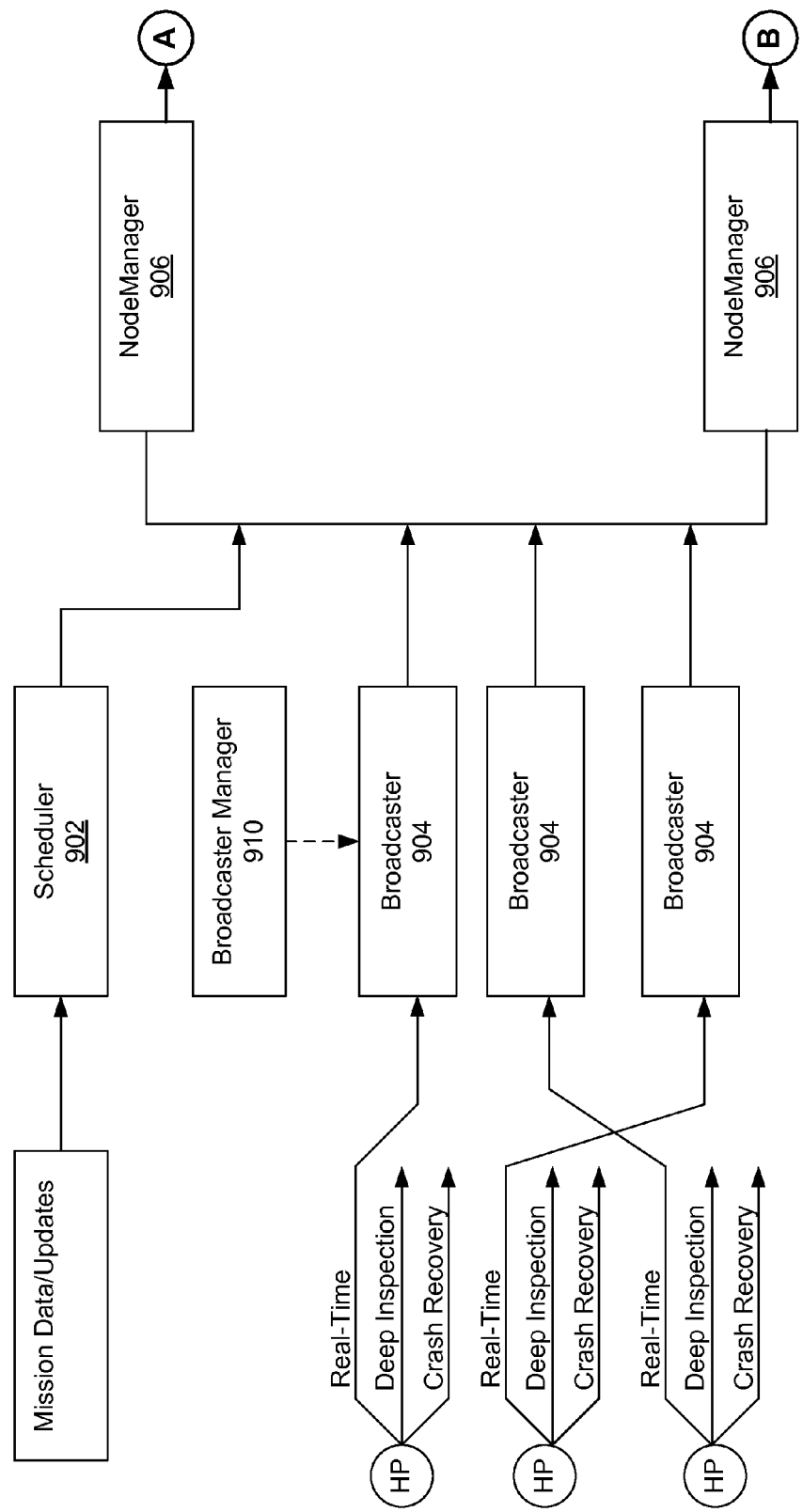
FIGS. 11A-11B illustrates an example flow for snippet processing, in accordance with some implementations.
Figure 11B:
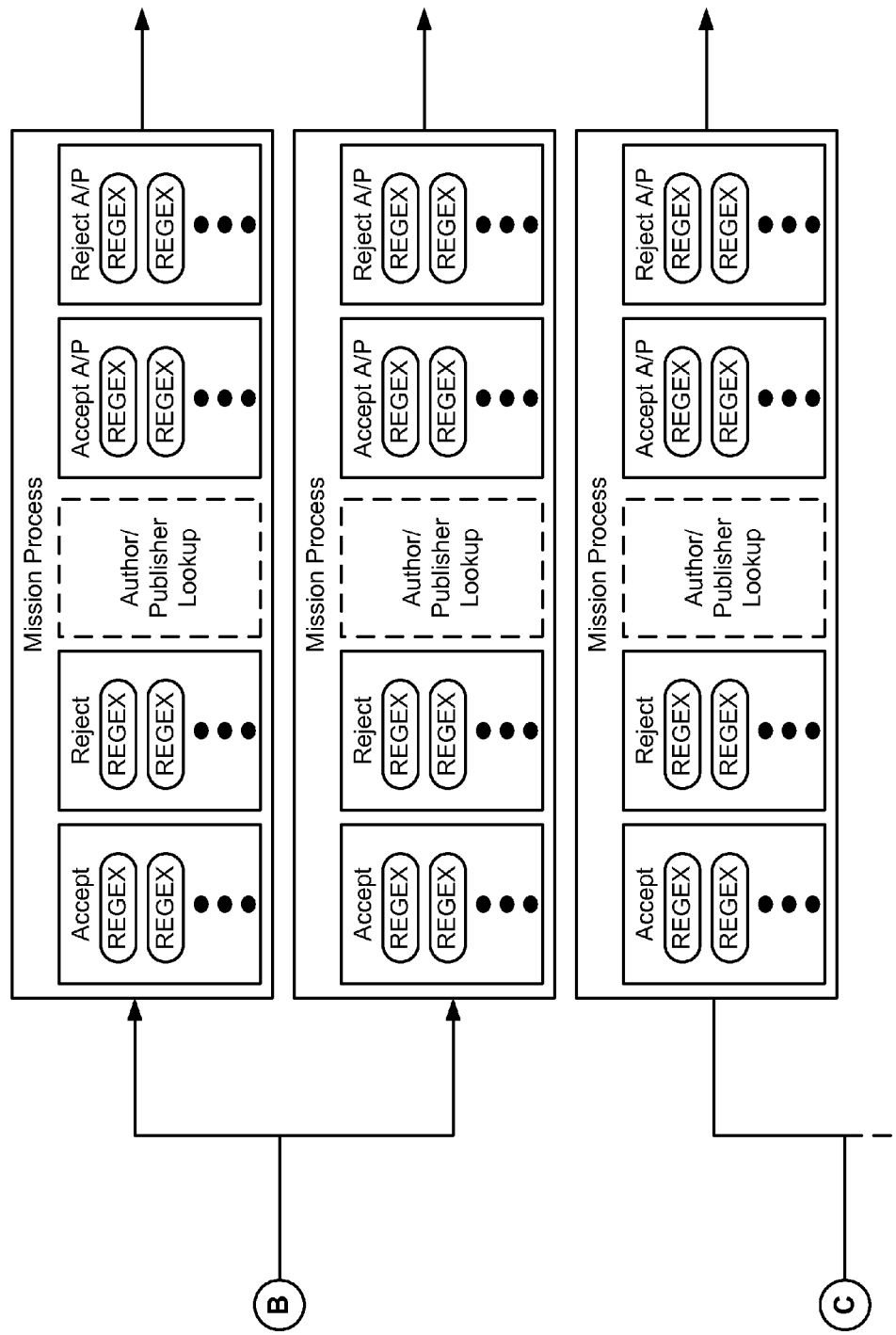

FIGS. 11A-11B illustrate an example flow for snippet processing. In some implementations, NodeManager 906 serves as the entry point for snippets on the Bouncer Worker Node 903. Snippets are sent to the NodeManager 906 via a fast work queue (e.g., a Beanstalk'd queue), and NodeManager 906 then broadcasts the snippets to all Workers 908. NodeManager 906 also manages a message queues (e.g., POSIX message queues) that are used to communicate with the Workers 908.

The worker processes perform the regular expression matching for Bouncer 536. There is typically one worker process per mission definition, so each worker has all the regular expression data needed to match snippets to its mission definition. By doing so, each worker operates independently from the others, thus avoiding any synchronization costs that would arise if the regular expressions of a mission definition were split over multiple workers. This parallelization method also scales well as the number of mission definitions increase, since the number of mission definitions does not affect the work done by a single worker (like it would if a worker handled multiple mission definitions).

In some implementations, a respective Worker 908 (e.g., a Worker 908-1) receives input snippets for a mission definition from a message queue, and outputs snippets accepted by the mission definition to a fast work queue (e.g., a Beanstalk'd queue). The respective worker 908 also maintains an internal copy of the search terms of that mission definition, and it receives updates to these via the input message queue. Similarly to other components in the system, the respective worker 908 will hold updates that it cannot immediately process and will try again later.

In some implementations, there are several stages involved in determining whether or not to accept a snippet (as shown in FIG. 11B). A snippet needs to pass through all the stages before it is accepted by the mission definition. First, worker 908 checks if the snippet's content (e.g., text) matches any of the mission definition's "accept" filters. Second, the snippet is discarded if its text matches any of the mission definition's "reject" filters. In some implementations, in addition to filtering by the snippet's content, Workers 908 can also filter a snippet using its author/publisher information and the language of the snippet. In some implementations, rather than utilizing the author/publisher Correlator 528 (FIG. 5), author/publisher correlation is only performed after a snippet has passed a missions content-related filters. In such implementations, a worker 908 looks up information regarding the author and/or publisher of the snippet (e.g., in a manner analogous to that which is described with reference to FIG. 8). Each of the author and publisher fields associated with the snippet should pass through its own "accept" and "reject" filters before being accepted. When the snippet's author/publisher does not have a field that is being filtered on, the filter specifies whether or not to accept the snippet. Since the author/publisher stage requires a look-up from an external location, it is expected to be slower than the snippet content filtering stage. But since a small percentage of snippets are expected to pass through the content filters, the lookup is only performed after the content has been accepted thus reducing the number of lookup requests by the workers. In addition to the regular expression filters, the mission definition also contains a set of accepted languages. This check is performed before any regular expression matching is done. If the snippet's "language" field matches a language in the set, the snippet goes through and is compared with the rest of the filters. If not, the snippit is discarded.

In some implementations, the actual regular expression matching is performed using IBM's ICU library. The ICU library assumes input snippets as UTF-8 encoded strings. A worker spawns multiple threads capable of doing the regular expression matching, so the worker can handle multiple snippets in parallel. In some implementations, multiple snippets may be associated with different sources. Each incoming snippet is assigned to a single worker thread that will perform the regular expression matching. Each thread reads from the mission definition data (but does not write) so it has access to the regular expressions necessary to match a snippet. This avoids the need for any synchronization between threads. One exception to this is when the worker needs to update the mission definition data, in which case all the snippet threads are blocked.

Once a snippet has passed all the author/publisher stages, the mission definition accepts snippet and outputs it to a predefined destination (e.g., in an email message, CRM, or the like).

Figure 12:
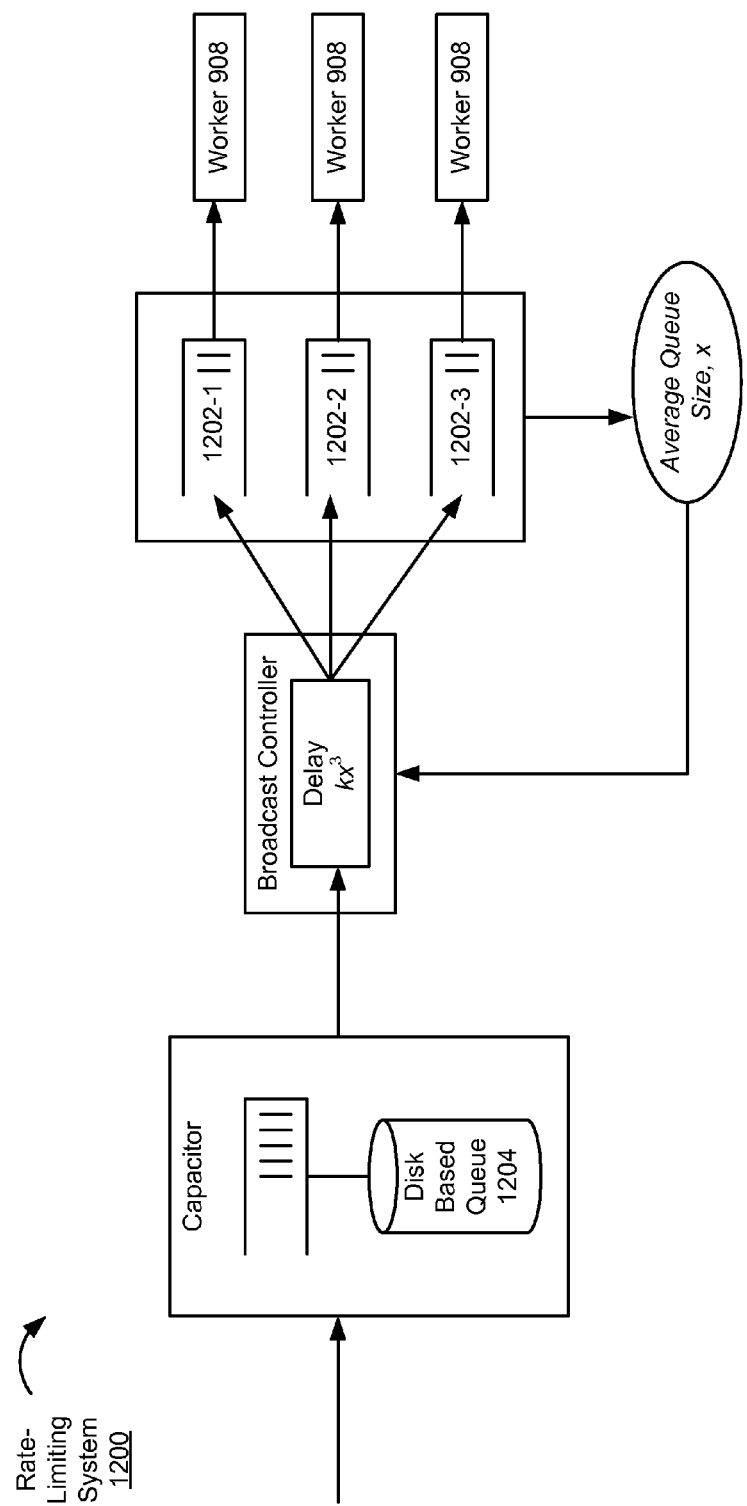
FIG. 12 illustrates a traffic smoothing system, in accordance with some implementations.

FIG. 12 illustrates a traffic, (e.g., rate-limiting) system 1200 optionally included in bouncer 536. Traffic to bouncer 536 does not arrive from harvester 522 at a constant rate. Rather, the traffic pattern may contain periods of low/moderate traffic followed by very high peaks that bouncer 536 cannot keep up with. Even though Bouncer 536 can, on average, handle the traffic, the stream of snippets can quickly build up in memory during one of these peaks. Due to the high snippet traffic, this buildup could quickly consume all RAM on a bouncer worker node 903, rendering it unusable.

The rate-limiting system 1200 is designed to ensure that peaks in traffic do not cause peaks in memory usage. Bouncer master node 909 broadcasts all snippets to each bouncer worker node 903. There, each snippet is placed in a local node queue 1202. A separate worker process pulls items off of a respective Local Node Queue 1202 and processes them through each filter on that Bouncer Worker Node 903. If the amount of processing cannot keep up with the incoming traffic, the respective local queue 1202 increases in size.

The Bouncer Master Node 909 monitors the size of the various Local Node Queues 1202 and uses them as feedback into the rate-limiting system 1200. In some implementations, a maximum rate is set to a value proportional to the cube of the average downstream queue size, x. A cubic function (e.g., $kx^3$, where k is a proportionality constant) provides a smooth transition between unlimited and limited traffic. For example, a queue size of 1 snippet happens very often and is no need to limit the rate at which snippets are fed to local queues 1202. However, were a linear function chosen, even a queue size of 1 would cause a noticeable rate limit delay. With a cubic function, however, the rate limit delay is not noticeable until the queue size is significant.

When the traffic from the Harvester 522 goes above a maximum rate (e.g., a rate which is inversely proportional to the rate limit delay), incoming snippets are placed into a Global Master Queue 1204 on the Bouncer Master Node 909. Global Master Queue 1204 writes items to disk-storage as it grows, ensuring that RAM usage does not grow out of control as snippets build up.

Figure 13:
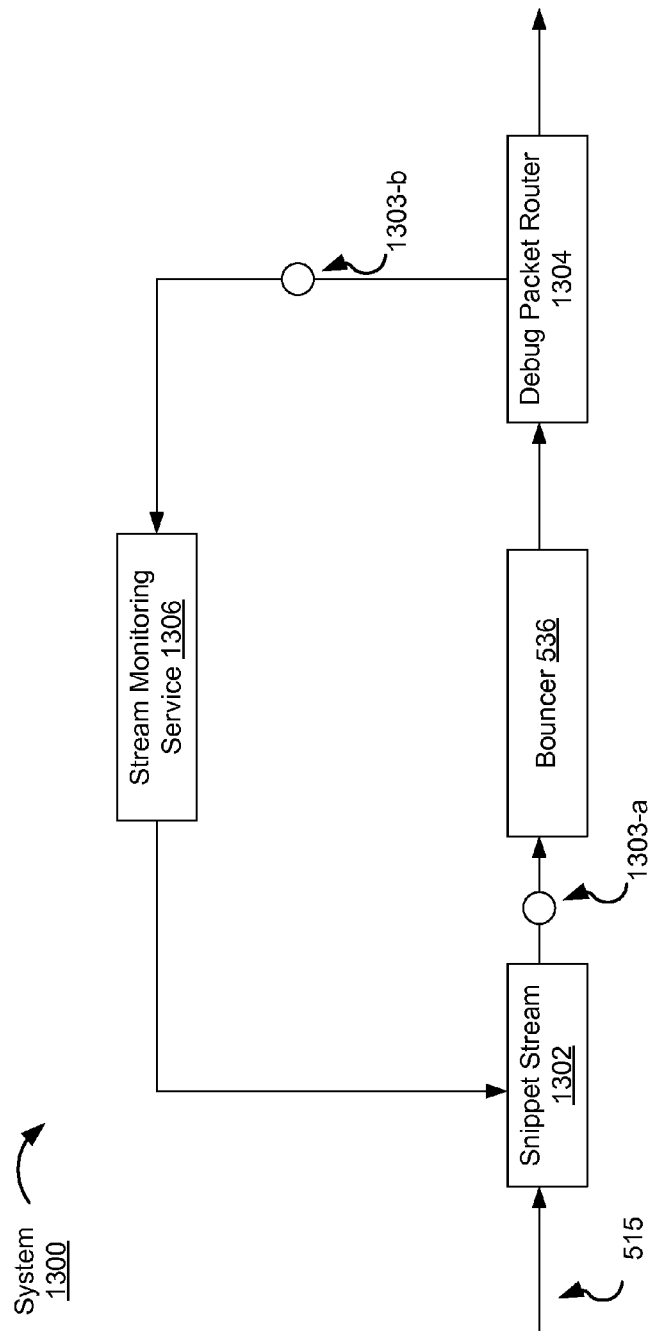
FIG. 13 illustrates a monitoring and debugging packet injection system, in accordance with some implementations.

FIG. 13 illustrates a monitoring and debugging packet injection system 1300, in accordance with some implementations. In general, a snippet stream 1302 that includes all of the snippets harvested by harvester 522 is transmitted to each mission definition via the path 515 (see FIG. 5). The snippet stream 1302 includes all of the relevant snippets (e.g., in some implementations, all of the snippets) and also includes a heartbeat message that is broadcast periodically (e.g., once a second). The heartbeat message informs subscribers that the feed is still active. However, a feed can remain silent for arbitrarily long periods of time without sending out any alarms. This is not an error, but it is indistinguishable from an internal error in the broadcasting network of bouncer 536 (e.g., an error in which snippets are not making it to the respective mission definition).

To detect this sort of error, a "debug" packet 1303 is periodically inserted into the snippet stream 1302 going into the bouncer 536 (1303-a indicates where the debug packet 1303 is initially inserted). Debug packets are configured as snippets that are accepted by every mission definition. To test the broadcasting network of the bouncer 536, a Debug Packet Router 1304 connects to every mission definition feed and waits for the next debug packet 1303. When it receives a debug packet, Debug Packet Router 1304 passes it to a stream monitoring service 1306 (1303-b indicates where the debug packet is routed by the debug packet router 1304). If a stream monitoring service 1306 receives the debug packet, then snippets have successfully arrived at the mission definition. Otherwise, a problem is detected with the mission definition and the problem can be reported using an alarm.

Figure 14A:
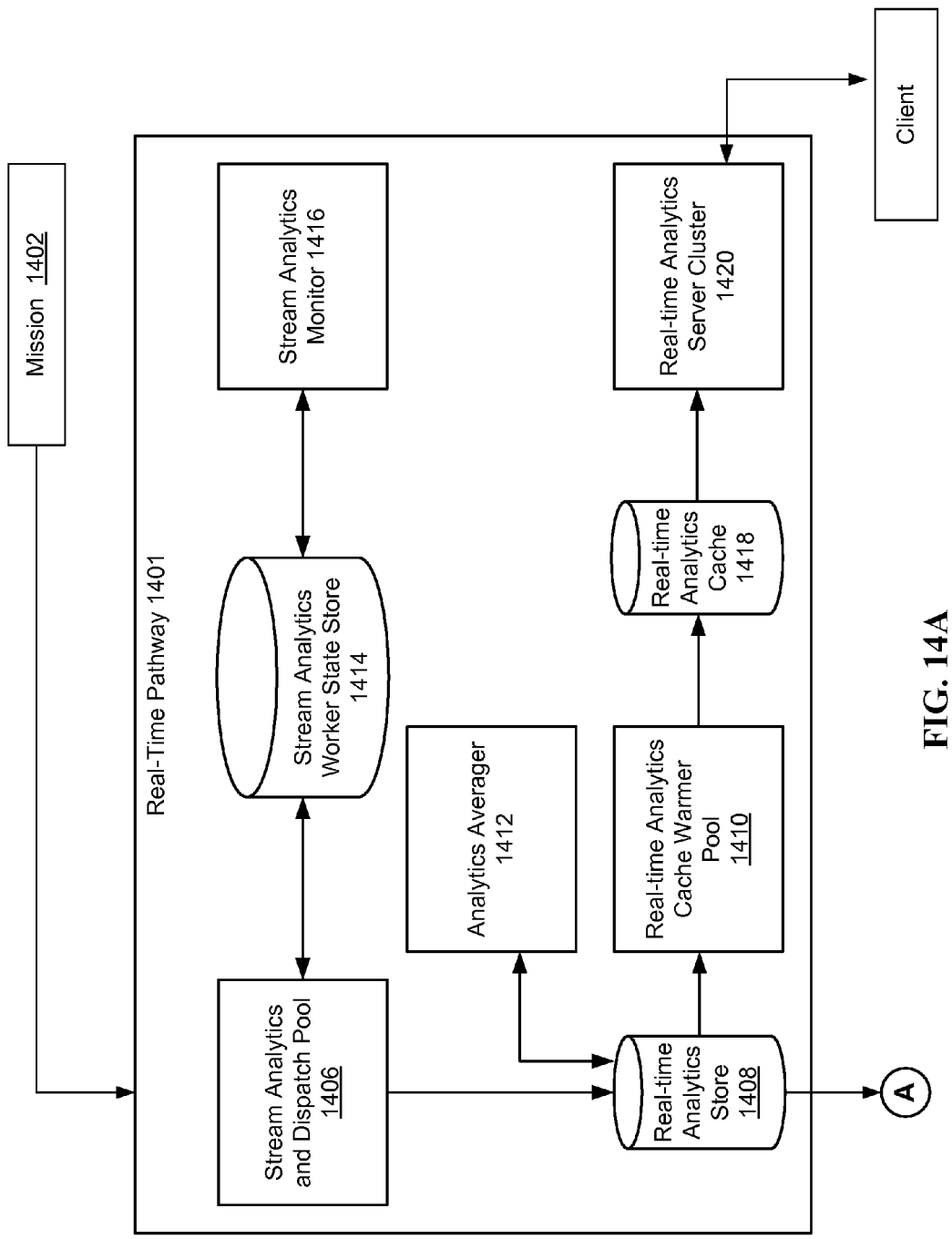
FIGS. 14A-14B are schematic diagrams illustrating an analytics/alarm system, in accordance with some implementations.
Figure 14B:
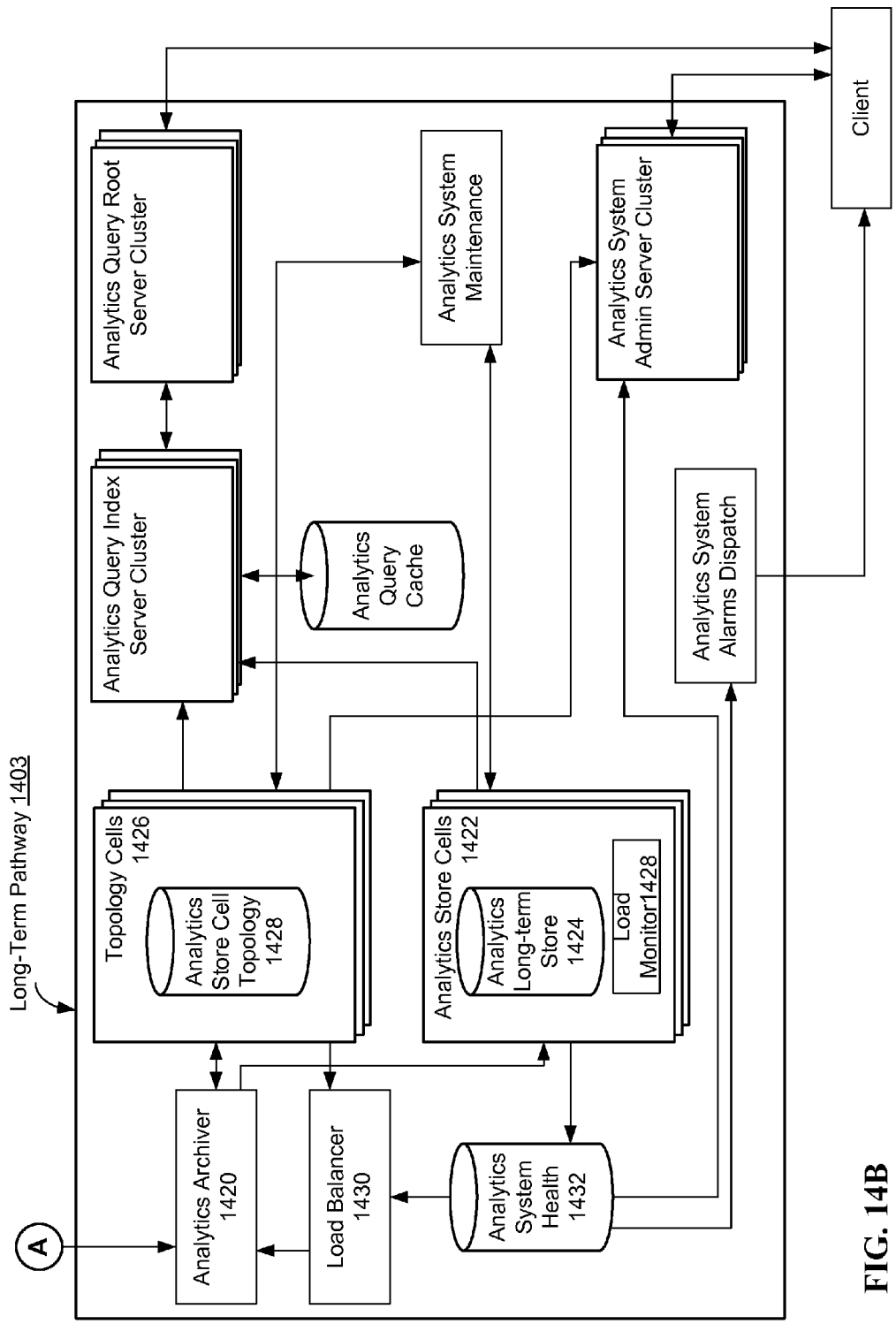

FIGS. 14A-14B illustrates an analytics/alarm hyper-engine system 538 (see FIG. 5) in accordance with some implementations. In some implementations, analytics data is collected and stored for different mission definitions (e.g., mission definition 1402). In some implementations, packet volumes for all streams are continuously calculated according to their publisher time and media type. Low latency access is required for two uses of analytics data—instantaneous monitoring and historical querying. Both instantaneous monitoring and historical querying require loading, organizing and delivering millions of data points. Instantaneous monitoring requires continuous calculation of volume averages to support trend analysis for predictive analytics and threat detection. Historical queries require access to any time range of stream data with arbitrary selection of granularity, sorting, and attributes. Interactive speed is necessary to support deep exploration of data. In addition, high scalability is required to maintain peak performance as data accumulates and new classification streams are added to the system.

In some implementations, the alarm analytics hyperEngine 538 is divided into two main pathways (e.g., subcomponents), real-time pathway 1401 (shown in FIG. 14A) and a long-term pathway 1403 (shown in FIG. 14B), to provide optimum performance for processing, real-time and/or nearly real-time monitoring and historical queries. The real-time pathway 1401 is the entry point for streams of classified packets. In some implementations, a stream of classified packets (sometimes referred to as "classification streams") exists for each mission definition and comprises packets broadcast to the mission definition as well as information indicating whether the packet was accepted, or not accepted, by the mission definition. The real-time pathway 1401 operates on continuously changing data at high transmission rates while providing fast access to millions of data points. In some implementations, the following tasks are performed within a data flow in the real-time pathway 1401:

Receiving classification streams from each executable mission definition;
Continuously calculating analytics for each classification stream;
Regularly publishing analytics data to a real-time store;
Caching real-time data packets to minimize retrieval latency and network traffic; and
Serving applications large quantities of stream analytics data at high speed.

In some implementations, real-time pathway 1401 is executed by an analytics worker. In some implementations, an individual analytics worker executing real-time pathway 1401 is dedicated to each mission definition.

In some implementations, executing real-time pathway 1401 includes a stream analytics and dispatch pool 1406 for each classification stream broadcast by the mission definition 1402. Each stream analytics and dispatch pool 1406 continuously calculates analytics for packets received from the stream according to the packets' publisher time and media type. The stream analytics and dispatch pools 1406 regularly publish analytics to a real-time analytics store 1408.

In some implementations, the real-time pathway 1401 includes a stream analytics worker state store 1414. Two queues—a running queue and a waiting queue—are maintained in the stream analytics worker state store 1414 to identify which mission definitions already have an analytics worker assigned, and which require an analytics worker. When assigned to a mission definition an analytics worker continuously publishes heartbeat messages and subscribes to control messages (e.g., mission definition control messages 1006, FIG. 6) related to its stream.

In some implementations, the real-time pathway 1401 includes a stream analytics monitor 1416. The stream analytics monitor 1416 includes a watchdog process that maintains the queues in the worker state store 1414 and monitors worker heartbeats. When a worker stops publishing heartbeats it is marked as dead and its mission definition is queued for reassignment to another worker. The stream analytics monitor 1416 subscribes to system messages related to stream states and forwards control messages to the appropriate workers.

In some implementations, real-time pathway 1401 includes an analytics averager 1412. There, averages are continuously calculated for all stream analytics and published to the real-time analytics store 1408. This data is used for trend analysis in threat detection and predictive analytics.

In some implementations, real-time pathway 1401 includes the real-time analytics store 1408. There, a storage layer is provided to facilitate parallelization of stream analytics and to protect against data loss in the event of worker failure. The storage layer keeps all data in memory to optimize data access speed and regularly persists data to disk to provide fault tolerance.

In some implementations, real-time pathway 1401 includes a real-time analytics cache warmer pool 1410. Because a single mission definition may potentially require continuously scanning millions of data points, stream analytics are packaged, compressed, and cached in real-time analytics cache warmer pool 1410 for speed and efficiency. This operation is distributed across a pool of workers for scalability.

In some implementations, real-time pathway 1401 includes a real-time analytics cache 1418, which receives stream analytics packages from analytics cache warmer pool 1410 and keeps information corresponding to the stream analytics packages in memory by a cache layer. This provides fast and consistent data to all downstream applications.

In some implementations, the real-time pathway 1401 includes a real-time analytics server cluster 1420. Real-time analytics server cluster 1420 comprises a cluster of servers that handles application requests for stream analytics. Each server is responsible for loading requested packages from the cache layer, decompressing packages, and translating raw analytics to a format optimized for network transmission and application consumption.

Referring to FIG. 14B, the long-term pathway 1403 provides permanent storage for analytics. The long-term pathway 1403 operates on large amounts of historical data. By partitioning data into parallel storage cells, long-term pathway 1403 provides high scalability, high availability, and high speed querying of time series analytics. In some implementations, the following tasks are performed within a data flow in the long-term pathway 1403:

Regularly retrieving analytics data from the real-time store.
Persisting data to analytics store cells.
Maintaining a topology of analytics store cells.
Continuously monitoring performance of analytics store cells and perform maintenance as necessary.
Dispatching alarms if system performance degrades.
Serving applications with query results summarizing large quantities of historical data at high speed.

In some implementations, an individual worker executing long-time pathway 1403 is dedicated to each mission definition.

In some implementations, long-term analytics pathway 1403 includes an analytics archiver 1420. There, historical stream analytics data is regularly transferred from the real-time pathway to permanent storage. An archive process loads data from the real-time analytics store 1408 and persists it to long-term analytics storage cells 1422 (e.g., in Analytics Long-term Store 1424), selecting appropriate storage cells based on information returned from the topology cells 1426 and the load balancer 1430.

In some implementations, long-term analytics pathway 1403 includes topology cells 1426. The distribution of data across storage cells 1422 is maintained in an indexed topology. The topology is replicated across multiple cells 1426 to provide high availability.

In some implementations, long-term analytics pathway 1403 includes an analytics store cell topology 1428. The topology stores the locations and functions of all storage cells, as well as the mapping of data to storage cells. The topology is consulted for information insertion and retrieval.

In some implementations, long-term analytics pathway 1403 includes one or more analytics store cells 1422. Data is evenly distributed across multiple storage cells to provide high availability and high scalability.

In some implementations, long-term analytics pathway 1403 includes an analytics long-term store 1424. The core of a storage cell is its permanent data store. Data within a store is partitioned into multiple indexed tables. Data store size and table size are optimized to fit in system memory to provide low latency queries.

In some implementations, long-term analytics pathway 1403 includes a load monitor 1428. The monitor 1428 process regularly collects statistics for the data store and system resource utilization, publishing the results to the system health store.

In some implementations, long-term analytics pathway 1403 includes load balancer 1430. When data must be mapped to a storage cell the load balancer is responsible for selecting the optimum mapping. Storage cell load statistics are read from the system health store and the load balancer selects the storage cell that will provide the most even distribution of data across cells.

In some implementations, long-term analytics pathway 1403 includes a analytics system health database 1432. Statistics for data stores and system resource utilization across all storage cells are centralized in the system health store.

Figure 15:
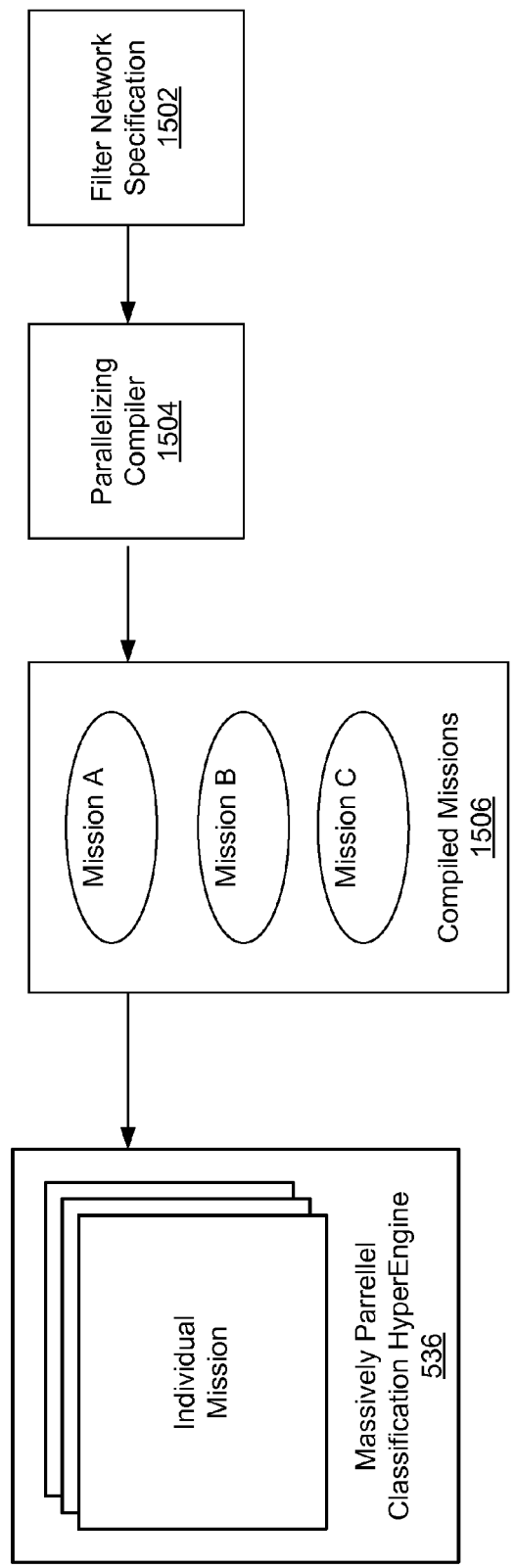
FIG. 15 is a schematic diagram illustrating a process of specifying and compiling a mission definition, in accordance with some implementations.

Optimization for Real-Time, Parallel Execution of Models for Extracting High-Value Information from Data Streams FIG. 15 illustrates the process of specifying and compiling a mission definition. A filter network specification 1502 is produced using, for example, a Visio Modeling Studio. In some implementations, for example, the visual modeling studio is an application with a user interface that allows users to drag-and-drop particular models into a general graph, as described in more detail with reference to FIGS. 16 and 17. A parallelizing compiler 1504 optimizes the filter network specification 1502 by, for example, appropriately merging, reordering filters and removing cycles (e.g., closed circuits within the general graph) that are extraneous to the filter and result in non-optimized performance. The parallelizing compiler 1504 also optimizes the manner in which filters are distributed to one or more processors in the Massively Parallel Classification HyperEngine 536. In some implementations, the parallelizing compiler 1504 is a pre-compiler that performs the tasks of optimizing the general graph and parallelizing the filters, but it does not translate the filters (e.g., the regular expression definitions) into machine readable code. In such implementations, the regular expressions are translated into deterministic finite automatons (DFA) by the parallelizing compiler 1504 and the DFAs are interpreted by a DFA interpreter coupled with the one or more processors in the Massively Parallel Classification HyperEngine 536.

The compiled mission definitions 1506 (e.g., mission definition a, mission definition b, mission definition c) are then transmitted to Massively Parallel Classification HyperEngine 536.

The purpose of the parallelizing compiler 1504 is to convert the high-level mission definition description language (comprising filters and taps) into a network of regular expressions that can be applied against incoming traffic efficiently. This compilation process consists of several steps:

Convert each instance of a filter to a set of regular expressions (regexes).

Concatenate regular expressions associated with a chain of filters into a single regular expression.

Merge the filters into a single graph, and "flatten" the filter network.

Perform various optimizations to generate the final graph of regex stages.

Combine trees of chain mission definitions into a single large mission definition (to simplify chain mission definition handling).

Assign the filter graph and associated mission definition feeds to appropriate worker VMs.

A filter consists of one or more phrases, short keywords/ regular expressions, as well as options describing how the phrases combine together. A phrase may be a user-defined variable, which differs for each instance of that phrase. These phrases, together with the spacing options, can be used to generate one or more regular expressions. The follow are two examples:

"a", "b", "c", all phrases beginning with "a", including "b", and ending with "c" with whitespace in-between is encapsulated as the regular expression: (a\s+b\s+c), "hello", "world", an instance of any of the two words is encapsulated as the regular expression (hello) and (world) OR (hello|world).

In some implementations, blocks of filters are split into multiple regular expressions for readability and performance. When a block must be concatenated with other blocks, it is always compiled to a single regular expression.

Filters in sequence are combined with a Boolean AND operation (e.g., a snippet must pass both Filter 1 AND Filter 2). Predefined groups of filters (called blocks) combine differently in sequence, by concatenating each regex from the blocks in order. For example, consider these blocks (previously compiled into regexes):

Sequence of Regex: (hello)→(\s+\S+){1,5}?\s+→(world)

Concatenated Regex: (hello)(\s+\S+){1,5}?\s+(world)

A filter represented by this sequence therefore accepts any snippet containing the word "hello" followed by up to 5 other words (separated by spaces) and then by the word "world."

Difficulty arises if the blocks in the graph are not all in sequence (e.g., some blocks are arranged in parallel). In this case, a regular expression is generated for all possible paths through the graph. In some implementations, this is accomplished via a depth-first traversal of this group of blocks to identify all of the paths. Groupings of blocks that have been merged are then referred to as stages.

Figure 16:
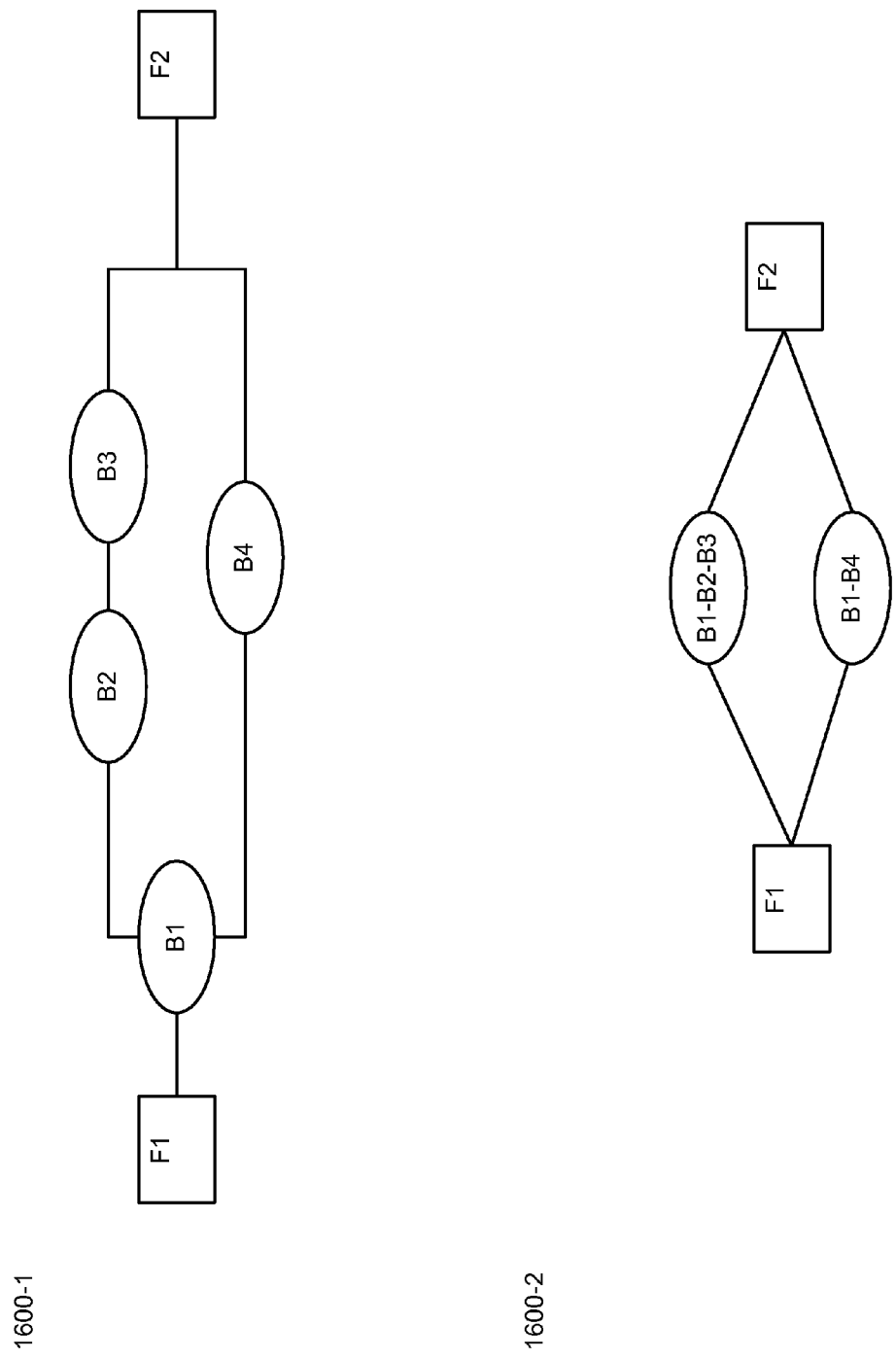
FIG. 16 illustrates an exemplary process of combining filters in the graph that are not all in sequence, in accordance with some implementations.

FIG. 16 illustrates combining blocks in the graph are not all in sequence. As shown in the figure, before the combination 1600-1, a filter network specification includes two filters F1 and F2 that are in sequence with a block B1. Blocks B2 and B3 are sequential, forming a path that is in parallel with another block B4. After the combination 1600-2, each parallel path is combined with the block B1, generating a regular expression for a possible path through the graph.

Once all groups of blocks have been compiled into regexes, each filter and block effectively forms a sub-graph of the mission definition. The parallelizing compiler 1504 recursively looks at each filter and block contained within a stage and merges its sub-graph into a larger graph. Since blocks may contain other filters, blocks are checked first (resulting in a depth-first traversal of the filter dependencies). The options associated with each filter (field, accept/reject, etc.) only apply to blocks in that graph, not the sub-graphs. Once the flattening is done, the result is a graph containing only stages of grouped regular expressions.

At this point, the graph can be optimized to decrease the work required to check a snippet. In some implementations, the parallelizing compiler 1504 utilizes one or more of the following optimizations:

Stages sharing the same options and marked as "accept" are merged into a single stage if they are in parallel;
Stages sharing the same options and marked as "reject" are merged into a single stage if they are in sequence;
Stages are reordered for fast rejection of snippets (e.g., blocks that require a fewer number of operations are applied to snippets earlier in the graph than blocks requiring a greater number of operations).

For an accept stage, a snippet is accepted if it matches any regex in the stage. Therefore, any separate accept stage that are in parallel are merged into a single block (simplifying the graph traversal). Parallel stages will only be merged if they share the exact same predecessors and successors. In the case of a reject stage, where a snippet passes if it does not match any regex, different merging logic is required. Instead of parallel stages, stages are only considered for merging when they are in sequence.

Figure 17:
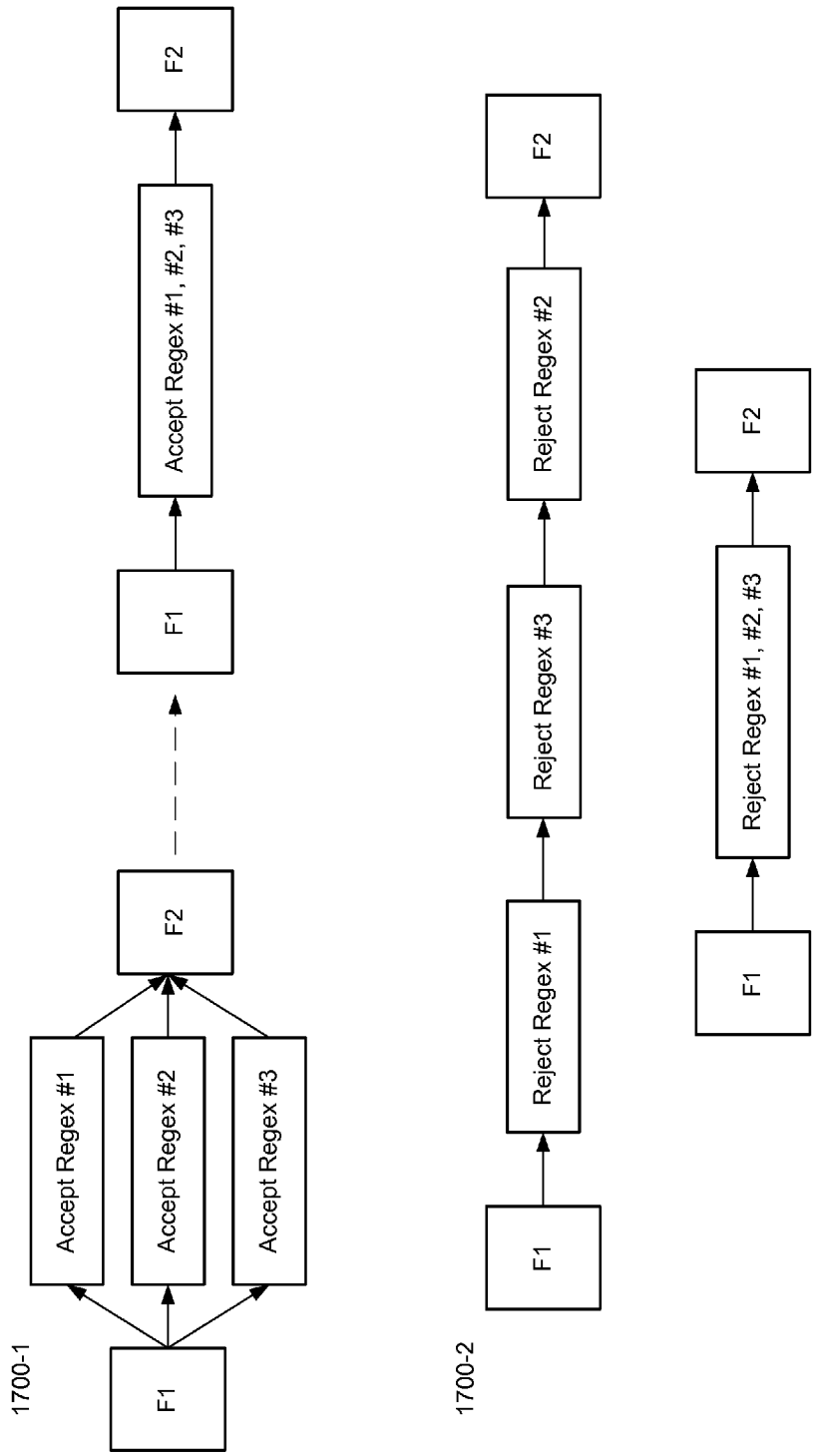
FIG. 17 illustrates an example of merging accept and reject regular expressions, in accordance with some implementations.

FIG. 17 illustrates an example of merging accept and reject regexes. As shown in 1700-1, accept regexes that are in parallel (e.g., accept regex #1, accept regex #2, accept regex #3) are merged whereas reject regexes that are in series (e.g., reject regexes #1, reject regex #2, reject regex #3) are merged.

In some circumstances, snippets are most likely to be rejected by the first few stages they encounter. Smaller stages (with fewer regexes) are faster to check. Therefore, further optimization occurs by reorganizing the stages to increase performance. In a chain of stages (or groups of stages), the parallelizing compiler 1504 reorders the stages to place the smaller ones ahead of other stages. Reordering allows smaller stages to reject those snippets as early as possible without checking them against the larger stages that come behind the smaller stages.

Figure 18:
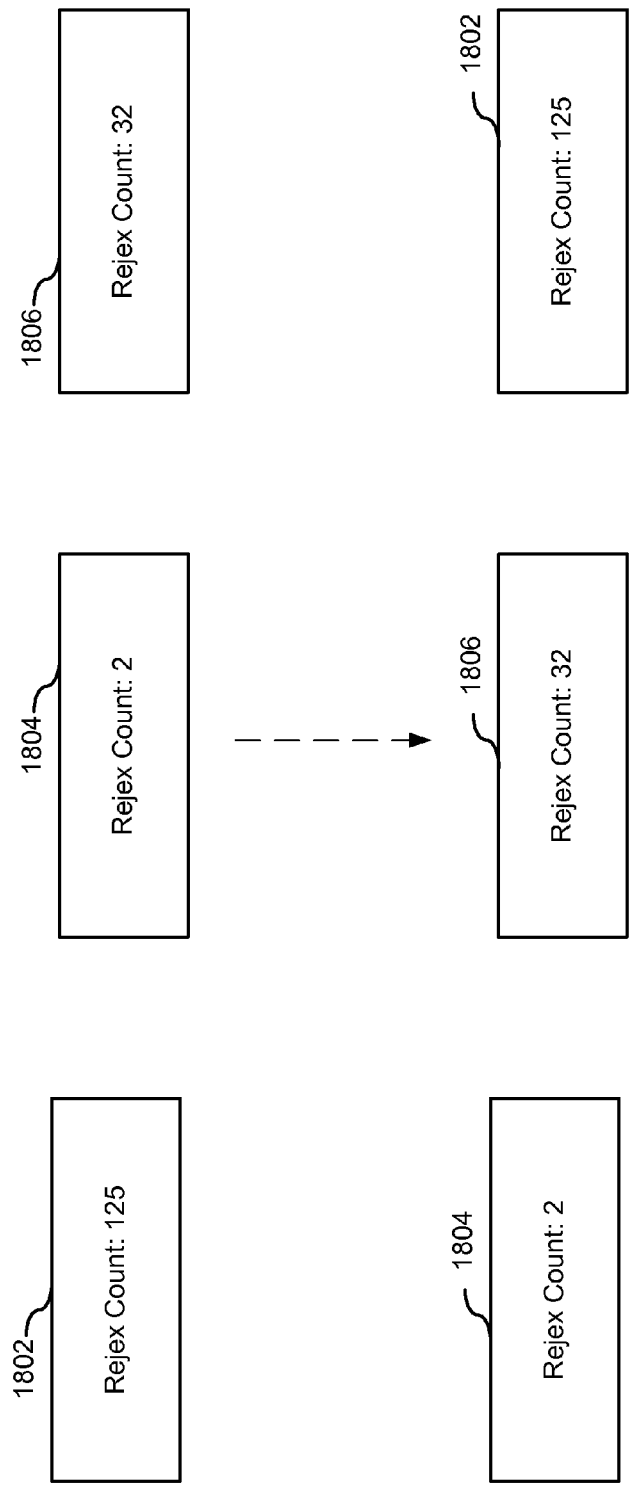
FIG. 18 illustrates an example or re-ordering filters based on the number of operations needed to determine whether the filter accepts or rejects a snippet, in accordance with some implementations.

FIG. 18 illustrates an example of reordering stages based on the number of operations necessary for determining whether the stage accepts or rejects a snippet (e.g., the number of regexes that the snippet is to be checked against within a stage). Stage 1802 includes 132 regexes, stage 1804 includes 2 regexes, and stage 1806 includes 32 regexes. Therefore, after reordering (e.g., to place the stages with the fewest number of regexes earliest), the reordered stages occur in the order: stage 1804, stage 1806, stage 1802.

In some implementations, mission definitions are chained together such that they receive their inputs from other mission definitions rather than the Harvester 522. These mission definitions are referred to as chain mission definition s. Chain mission definitions present additional restrictions on stage merging and reordering because a snippet cannot be checked against a chain mission definition until all mission definitions in the chain have also been checked (thus, chain mission definitions include constraints on their placement within the chain). To handle this, all chain mission definitions connected to a Harvester mission definition are combined into one single mission definition graph. Each mission definition is treated as a special version of a tap.

Once a mission definition has been compiled, it is assigned to one or more virtual machines (VM) where snippet processing takes place. In some implementations, a mission definition includes two components: a filter graph and a list of feed names (e.g., names corresponding to data sources 522). Each feed is assigned to a location, and it receives accepted snippets from the VM where the filter graph is located. It then publishes the snippet to all downstream systems. Decoupling snippet processing from the publishing stage allows the mission definition graph to be freely moved between VMs without dropping any snippets. This is helpful for the dynamic load balancing described later.

Snippets are processed in parallel. The system 502 exploits the fact that filter graphs are independent of each other to boost performance by massive parallelization. Parallel processing is achieved on 2 levels: among the different machines in the system, and among each core on a single machine.

Parallelism amongst different machines happens when each respective mission definition is allocated to a VM (e.g., at least two mission definitions are allocated respectively to distinct virtual machines). The mission definitions are divided up equally (or substantially equally) among the VMs. Each respective VM receives a duplicate of the entire snippet stream, so the VM can process the stream according to the mission definition filter graphs assigned to that machine independently of other mission definition filter graphs assigned to other machines. When a new mission definition is added, it is assigned to the VM that has the least load at the moment.

In some implementations, the load of a mission definition is measured by the average number of streaming classification operations per second (SCOPS) required to check a snippet. Changes in a mission definition (or the creation/destruction of a mission definition) may change the load of the mission definition. As a result, the load on the VMs may become unbalanced over time. To counter this, the system 502 implements dynamic load balancing. The load of each mission definition is periodically measured, and then mission definitions are redistributed among the VMs to keep the load as balanced as possible. In order to prevent dropped or duplicated snippet, the entire system is be synchronized.

When necessary, in some implementations, a mission definition graph is split into smaller but equivalent graphs. This allows the dynamic load-balancing process to have finer control over the distribution of work.

Figure 19:
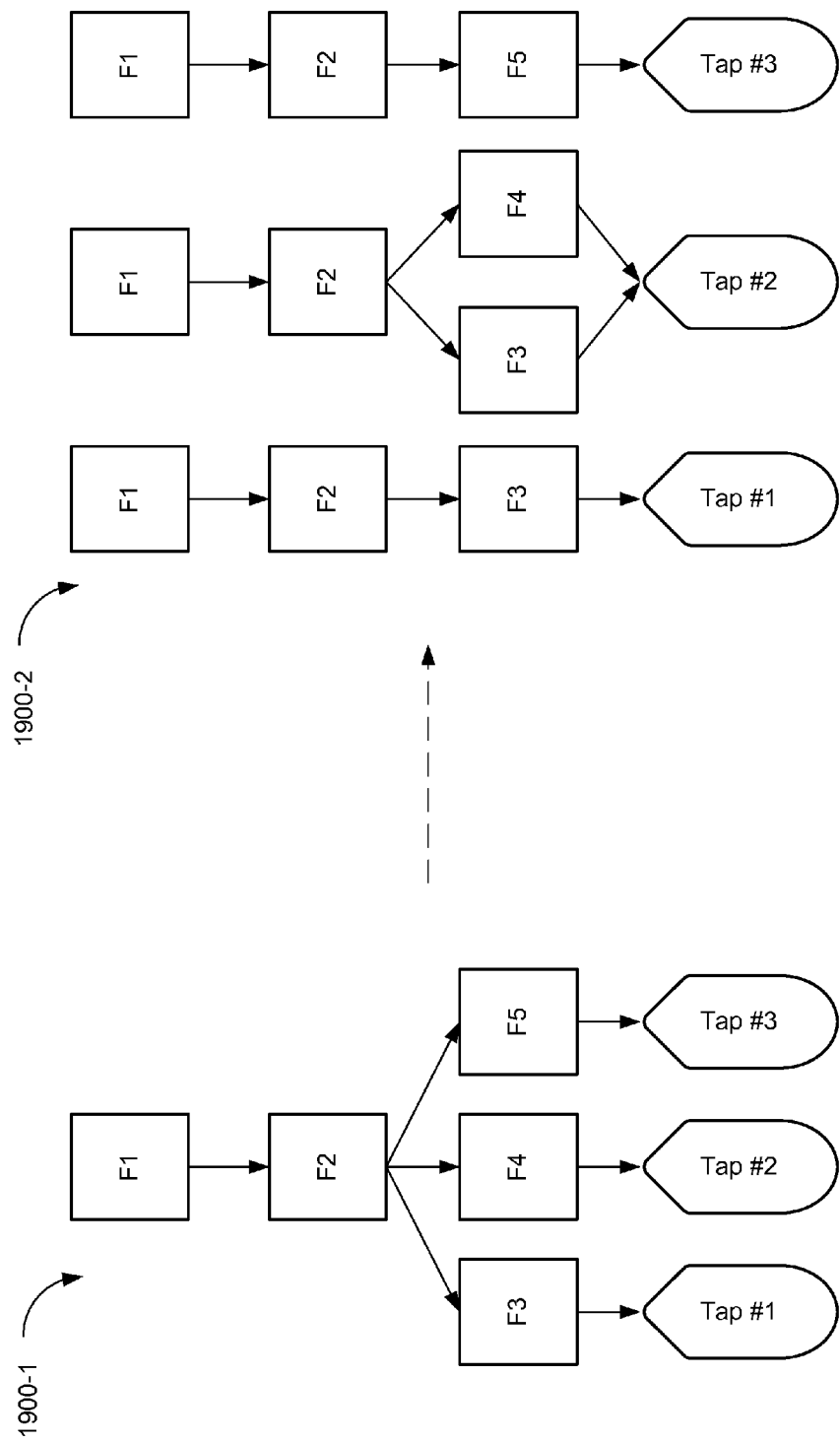
FIG. 19 illustrates an example of splitting a mission definition graph into smaller equivalent graphs by creating a new mission definition for each tap, in accordance with some implementations.

FIG. 19 illustrates an example of splitting a mission definition graph into three smaller equivalent graphs by creating a new mission definition for each tap (e.g., leaf node). In some implementations, the new mission definition for a respective tap is determined by taking the union of all paths leading from the start node to that Tap, for example, by using a depth-first search. In the example shown in FIG. 19, the system determines that, to reach Tap #1, a snippet must pass F1 AND F2 AND F3. To reach Tap #2, a snippet must pass F1 AND F2 AND (F3 OR F4). Likewise, to reach Tap #3, a snippet must pass F1 AND F2 AND F5. Thus, the mission definition graph shown in 1900-1 can be split into three respective filter graphs shown in 1900-2. If stages F1 and F2 accept a large amount of traffic but are significantly easier to check than F3, F4 and F5, then the system will benefit from splitting the mission definition. When other Taps (e.g., other than the respective tap) are encountered (e.g., in the depth-first search), the other taps are disabled for new mission definition corresponding to the respective tap.

Virtual machine level parallelism occurs on a single VM. All available cores check incoming snippets against all local mission definitions in parallel. Snippets are distributed evenly between cores.

To determine if a mission definition will accept a snippet, the content of the snippet is checked against the mission definition's filter graph. Initially, the snippet is checked against the root stage of the filter graph. If it passes through a stage, it is checked against that stage's successors, and so on, until it fails a stage's check. When that happens, the traversal stops. A snippet is accepted if the traversal finds its way to an end stage (either a mission definition endpoint, or a tap).

To avoid doing unnecessary checks and therefore improving the system performance, and early rejection optimization is disclosed herein. If at any point it becomes impossible for a snippet's traversal to hit an endpoint, the traversal is terminated (even if there are still paths to check). This is implemented by determining "dominator" stages for each endpoint. A stage X "dominates" another stage Y if every path that reaches Y must include X. An endpoint's list of dominators is pre-computed as part of the compilation process. If a snippet fails to pass through a dominator stage, the dominated endpoint is marked as being checked. Traversal finishes when all endpoints have been marked as being checked (either by reaching them explicitly or rejected through dominators).

In some implementations, the existence of cycles in the filter specification (e.g., closed form cycles, also referred to as closed circuits) is detrimental to system performance. These cycles occur when a user unwittingly connects the output of a model to the input of the same model (e.g., indirectly, with other filters and/or blocks in between) in a filtering chain, thus creating a feedback closed circuit. In some implementations, the compiler detects and removes such closed circuits while performing the compiler optimization operations (e.g., like those discussed above). In alternative implementations, a closed circuit removal stage of the parallel compiler 1504 is run every time a user edits the filtering network (e.g., in the visual modeling studio).

Figure 20:
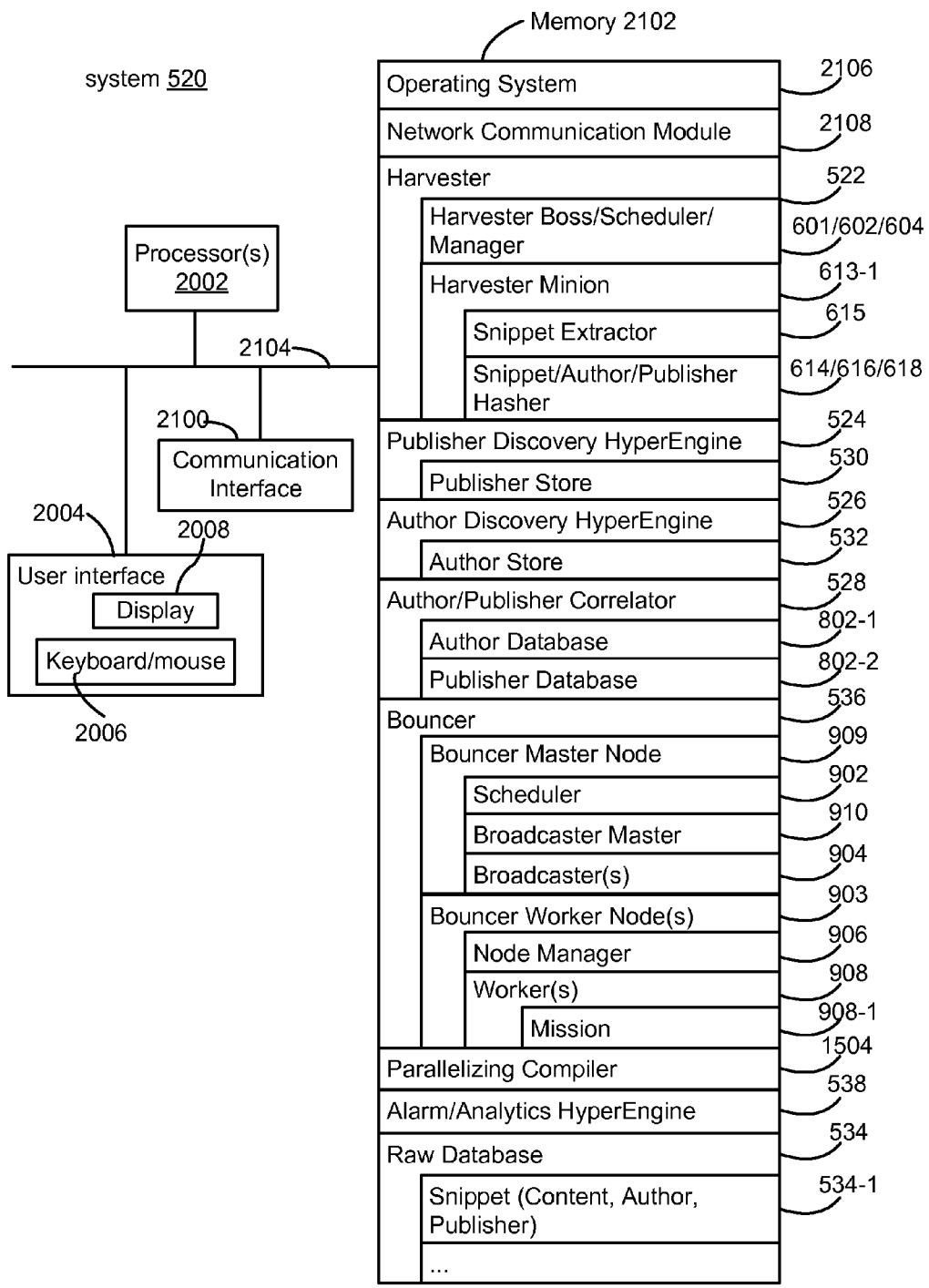
FIG. 20 is block diagram of a computer system for real-time extraction of high-value information from data streams, in accordance with some implementations.

FIG. 20 is a block diagram illustrating different components of the system 520 that are configured for analyzing stream data in accordance with some implementations. The system 520 includes one or more processors 2002 for executing modules, programs and/or instructions stored in memory 2102 and thereby performing predefined operations; one or more network or other communications interfaces 2100; memory 2102; and one or more communication buses 2104 for interconnecting these components. In some implementations, the system 520 includes a user interface 2004 comprising a display device 2008 and one or more input devices 2006 (e.g., keyboard or mouse).

In some implementations, the memory 2102 includes high-speed random access memory, such as DRAM, SRAM, or other random access solid state memory devices. In some implementations, memory 2102 includes non-volatile memory, such as one or more magnetic disk storage devices, optical disk storage devices, flash memory devices, or other non-volatile solid state storage devices. In some implementations, memory 2102 includes one or more storage devices remotely located from the processor(s) 2002. Memory 2102, or alternately one or more storage devices (e.g., one or more nonvolatile storage devices) within memory 2102, includes a non-transitory computer readable storage medium. In some implementations, memory 2102 or the computer readable storage medium of memory 2102 stores the following programs, modules and data structures, or a subset thereof:

- an operating system 2106 that includes procedures for handling various basic system services and for performing hardware dependent tasks;
- a network communications module 2108 that is used for connecting the system 520 to other computers (e.g., the data sources 502 in FIG. 5A) via the communication network interfaces 2100 and one or more communication networks (wired or wireless), such as the Internet, other wide area networks, local area networks, metropolitan area networks, etc.;
- a Harvester 522 for collecting and processing (e.g., normalizing) data from multiple data sources 502 in FIG. 5A, the Harvester 522 further including a Harvester Boss 601, a Scheduler 602, a Harvester Manager 604, and one or more Harvester Minions 613-1, which are described above in connection with FIG. 6, and a Harvester Minion 613-1 further including a snippet extractor 615 for generating packets for the snippets, authors, and publishers encoded using appropriate data structures as described above with reference to FIG. 7, and a snippet hasher 614, an author hasher 616, and a publisher hasher 618 for generating a hash key for the snippet content, author, and publisher of the snippet, respectively;
- a Publisher Discovery HyperEngine 524 for inspecting the data stream from the data sources 502 in order to develop a publisher profile for a data source based on, e.g., the snippets published on the data source and storing the publisher profile in the publisher store 530;
- an Author Discovery HyperEngine 526 for inspecting the data stream from the data sources 502 in order to develop an author profile for an individual based on, e.g., the snippets written by the individual on the same or different data sources and storing the author profile in the author store 532;
- an Author/Publisher Correlator 528 for performing real-time data correlation with existing author information in the author database 802-1 and existing publisher information in the publisher database 802-2 to determine a respective snippet's author and publisher;
- a Bouncer 536 for identifying high-value information for a client of the system 520 from snippets coming from different data sources by applying the snippets to mission definitions associated with the client, the Bouncer 536 further including a bouncer master node 909 and one or more bouncer worker nodes 903, the bouncer master node 909 further including a scheduler 902, a broadcaster master 910, and one or more broadcasters 904, whose functions are described above in connection with FIG. 9, and each bouncer master node 909 further including a node manager 906 and one or more workers 908 (each worker handling at least one mission definition 908-1), a more detailed description of the components in the Bouncer 536 can be found above in connection with FIG. 9;
- a Parallelizing Compiler 1504 for optimizing a filter network specification associated with a client of the system 520 by, e.g., appropriately merging, reordering filters and removing cycles from the resulting filter network, etc.;
- an Alarm/Analytics HyperEngine 538 for determining if and how to deliver alarm messages produced by the Bouncer 536 to end-users using, e.g., predefined communication protocols with the end-users, and generating short-term or long-term statistics through analyzing the incoming information as well historical information from the data sources and determining whether or not to trigger alarms for any violations of predefined criteria associated with a client of the system; and a Raw Database 934 for backing up snippets from the data sources, e.g., after the snippets are normalized by Harvester 522, each snippet having content, author, and publisher information.

It should be noted that the programs, modules, databases, etc., in the Pulsar system 520 describe above in connection with FIG. 20 may be implemented on a single computer server or distributed among multiple computer servers that are connected by a computer network. Although a specific hardware configuration may affect the performance of the Pulsar system 520, the implementation of the present application does not have any dependency on a particular hardware configuration.

Figure 21:
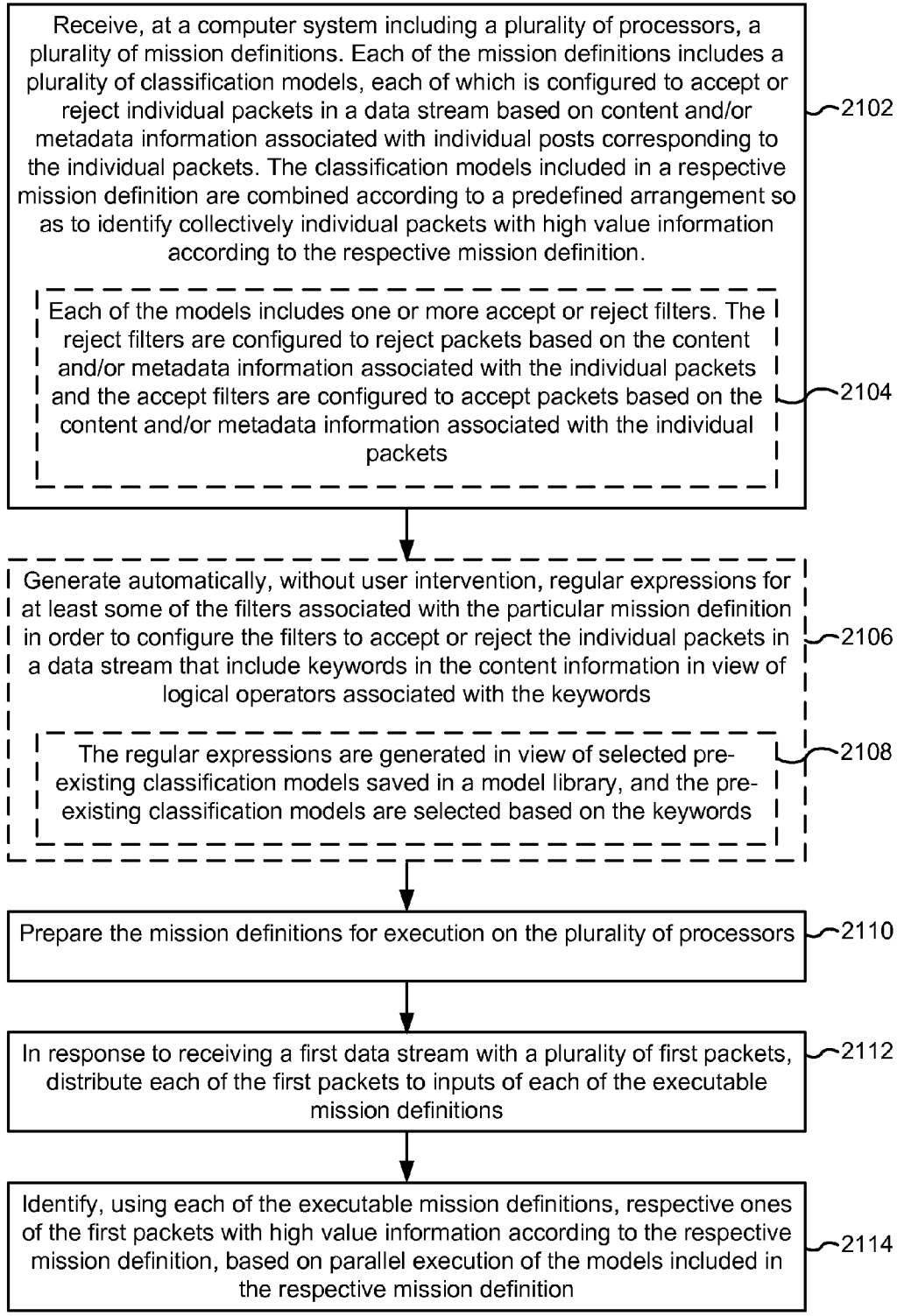
FIG. 21 is a flow chart illustrating a method of creating hierarchical, parallel models for extracting in real-time high-value information from data streams, in accordance with some implementations.

FIG. 21 is a flow chart illustrating a method 2100 of creating hierarchical, parallel models for extracting in real time high-value information from data streams and system, in accordance with some implementations. The method 2100 is performed at a computer system including a plurality of processors and memory storing programs for execution by the processors.

The method 2100 includes receiving (2102) a mission definition. In some embodiments, a mission definition comprises a filter graph. The mission definition includes a plurality of classification models, each classification model including one or more filters that accept or reject packets. For example, in some embodiments, each classification model is a node on the filter graph (e.g., a "filter node"). Each respective filter is categorized by a number of operations (e.g., a count, such as 4, 6, or 9 operations), and the collection of filters is arranged in a general graph (e.g., the filter graph is defined by the plurality of classification models/filter nodes and a plurality of graph edges connecting the classification models/filter nodes). In some implementations, the filter graph is a directed graph, meaning that there is a direction associated with each graph edge. In other words, the filter graph is configured such that packets move from filter node to filter node within the graph with a predefined direction associated with the graph edge connecting the two filters nodes.

In some implementations, filter graphs are stored in a computer file or data structure. For ease of explanation, such computer files or data structures are also referred to as "filter graphs." In some implementations, the mission definition (e.g., filter graph) is received by a particular module in the computer system (e.g., Bouncer 536, FIG. 5) from a different module in the computer system (e.g., Parallelizing Compiler 538, FIG. 5). In some implementations, the mission definition (e.g., filter graph) is received from an external computer system (e.g., an external client or server connected to the computer system via a network connection). In some implementations, the mission definition (e.g., filter graph) is received at one or more processors of the computer system (e.g., processors 2002, FIG. 20).

In some implementations, each of the models includes (2104) one or more accept or reject filters. In some implementations, the accept and reject filters are at least partially embodied as regular expressions (which, for example, can be embodied at a lower computing level, such as in machine code, as deterministic finite automata (DFAs) or non-deterministic automata (NDA)). The reject filters are configured to reject packets based on the content and/or metadata information associated with the individual packets and the accept filters are configured to accept packets based on the content and/or metadata information associated with the individual packets. In some implementations, each of the mission definitions (e.g., filter graphs) is configured to identify an incoming packet as a packet with high value information when the incoming packet is not rejected by any of the reject filters and the particular packet is accepted by a predefined combination of the accept filters. In some implementations, the predefined combination is each of the accept filters. In some implementations, the reject and accept filters are defined using one or more of: regular expressions or any Non-Deterministic Automata (NDA)/Deterministic Finite automata (DFA) specification language. In some implementations, the reject and accept filters are configured for execution in parallel on a plurality of the processors.

In some implementations, each of the models embody one or more of: lexical filters, semantic filters, and ontological filters.

In some implementations, the method 2100 further includes generating (2106) automatically, without user intervention, regular expressions for at least some of the filters associated with the particular mission definition (e.g., filter graph) in order to configure the filters to accept or reject the individual packets in a data stream that include keywords in the content information in view of logical operators associated with the keywords. In some embodiments, the graph edges of a respective filter graph are generated in accordance with logical relationships between the classification models (e.g., filter nodes) of a mission definition (e.g., filter graph). In some implementations, the logical operators include NOT, OR, NOR, NAND and XOR. In some implementations, the regular expressions are generated (2108) in view of selected pre-existing classification models (e.g., filter nodes) saved in a model library, and the pre-existing classification models are selected based on the keywords. For example, in some circumstances, a front-end user will develop a mission definition (e.g., filter graph) using an integrated development environment (IDE) with a graphical user interface and one or more libraries of models, each of which comprises one or more filters. In such circumstances, the user will "drag-and-drop" models into place to form (e.g., organize the models into) a general graph, which represents the mission definition (e.g., filter graph). In some implementations, one or more of the models will be keyword-based (e.g., filters within the model will be configured to accept or reject packets having a particular brand name within the contents of the packet). In some implementations, the models are organized into a general graph automatically without user intervention (e.g., by a client interface or a compiler).

In some implementations, the models include one or more of textual filters that are applied to text content of the packets, author filters that are applied to the author information associated with the packet, or publisher filters that are applied to the publisher information associated with the packets.

In some implementations, processing each of the packets includes first executing the textual filters on the content of the packets, including executing one or more reject or accept filters that reject or accept a packet based on the content and/or metadata of the packet, then executing the author and/or publisher filters on the packets not rejected by the textual filters, including executing one or more reject or accept filters that reject or accept a packet based respectively the author or publisher information associated with the packet. In some implementations, the accept and reject filters include accept and reject text filters that are applied in real-time to text content of the packets.

In some implementations, the keywords are translated by a compiler into regular expressions. In some implementations, each of the mission definitions (e.g., filter graphs) is independent of other mission definitions (e.g., filter graphs).

In some implementations, a subset of the classification models (e.g., filter nodes) in one or more of the mission definitions (e.g., filter graphs) are concatenated in a one-dimensional chain, so as to enable extraction of high-value information at different levels of specificity for the one or more mission definitions (e.g., filter graphs). For example, one or more of the mission definitions (e.g., filter graph) include a plurality of taps (e.g., leaf nodes of the filter graph, as described, for example, with reference to FIG. 1) positioned at the outputs of respective models, such that the taps allow the state of the respective model to be examined and/or used as inputs to other mission definitions (e.g., filter graphs) and/or models.

The method 2100 further includes preparing (2110) the mission definitions (e.g., filter graphs) for execution on the plurality of processors (e.g., compiling, optimizing, and the like).

The method 2100 further includes, in response to receiving a first data stream with a plurality of first packets, distributing (2112) each of the first packets to inputs of each of the executable mission definitions (e.g., filter graphs).

The method 2100 further includes, identifying (2114), using each of the executable mission definitions (e.g., in accordance with each of the executable mission definitions), respective ones of the first packets with high value information according to the respective mission definition (e.g., filter graph), based on parallel execution of the models included in the respective mission definition.

In some implementations, the method 2100 further includes, injecting a plurality debug packet into the first data stream in accordance with a predetermined schedule.

In some implementations, the method 2100 further includes determining, in accordance with the predetermined schedule, whether the debug packet was received at a terminus of each of the executable mission definitions. Reception of the debug packet at a respective terminus of a respective executable mission definition indicates active broadcasting of packets to the respective executable mission definition In some implementations, the method 2100 further includes, when the debug packet was not received at the respective terminus, providing an indication to a user of the respective mission definition that broadcasting of packets to the respective mission definition is not active.

Figure 22A:
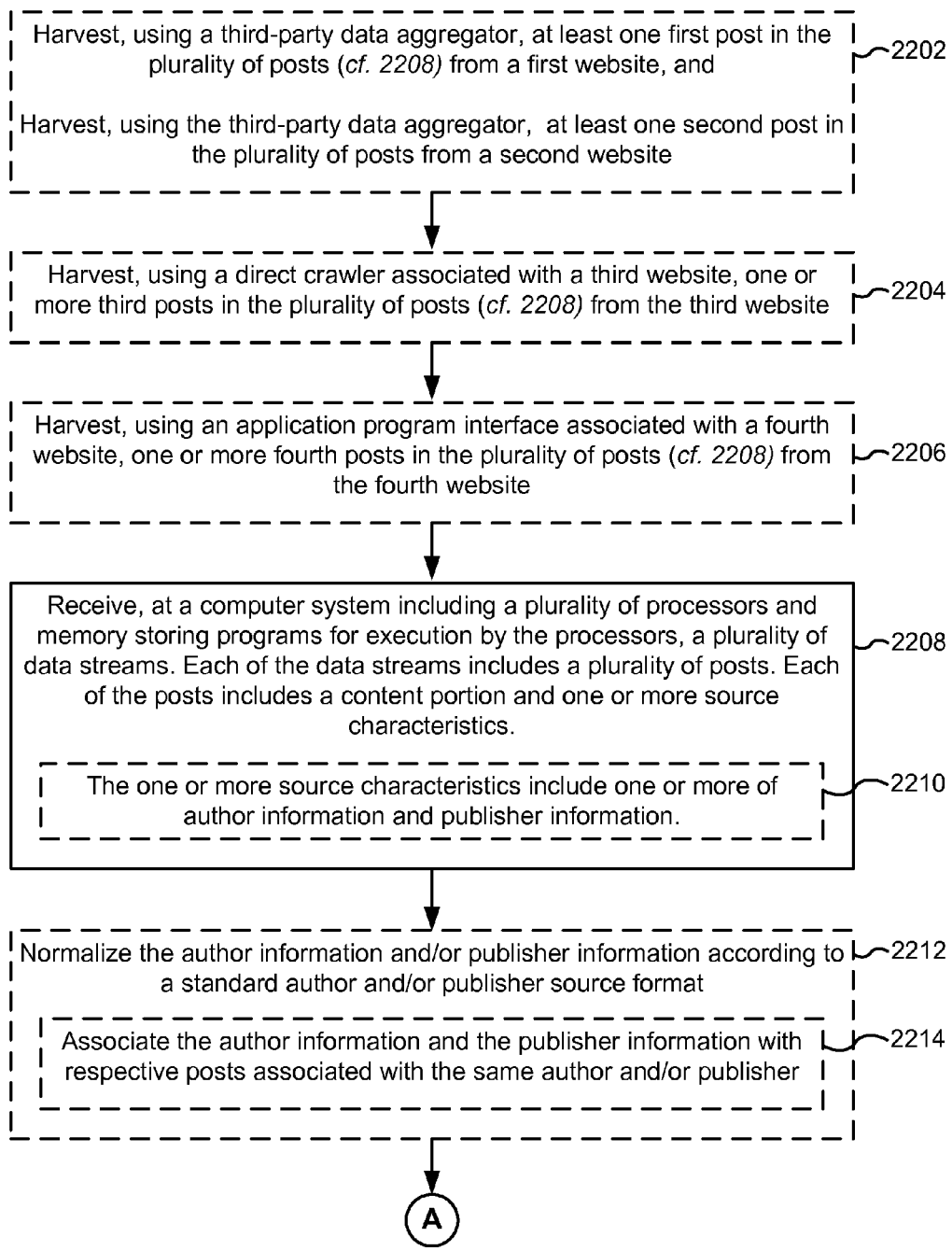
FIGS. 22A-22C are flow charts illustrating a method for real-time extraction of high-value information from data streams, in accordance with some implementations.
Figure 22B:
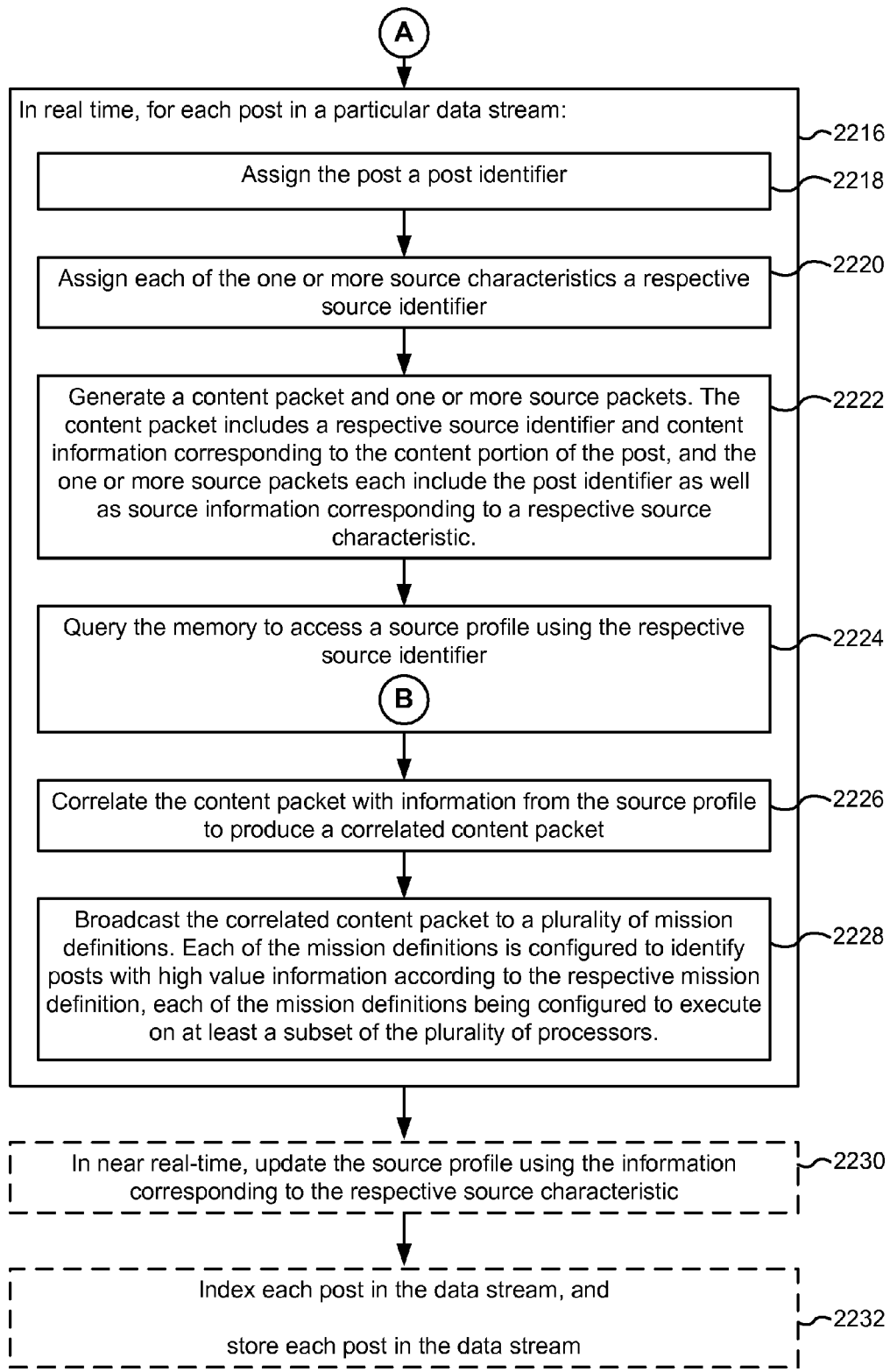
Figure 22C:
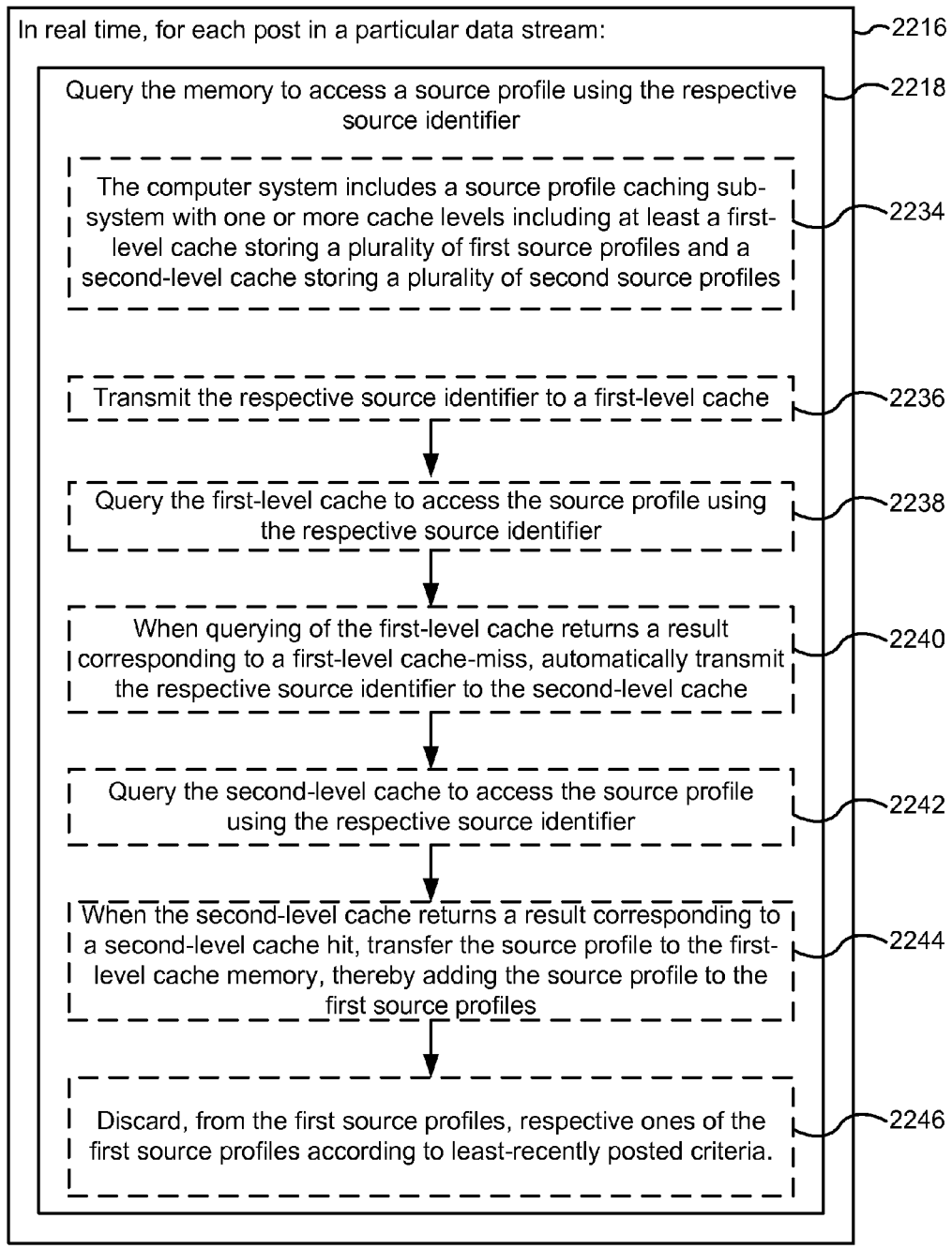

FIGS. 22A-22C are flow charts illustrating a method 2200 for real-time extraction of high-value information from data streams, in accordance with some implementations. The method 2200 is performed at a computer system including a plurality of processors and memory storing programs for execution by the processors.

In some implementations, as a preliminary operation, the method 2200 includes harvesting (2202), using a third-party data aggregator, at least one first post in the plurality of posts (cf. 2208) from a first website, and harvesting, using the third-party data aggregator, at least one second post in the plurality of posts from a second website.

In some implementations, as a preliminary operation, the method 2200 includes harvesting using a direct crawler associated with a third website, one or more third posts in the plurality of posts (cf. 2208) from the third website. As described previously, direct harvesting is particularly useful when, for example, a relatively niche website (e.g., a website that is unlikely to be crawled by a third-party data aggregator) publishes a large number of posts that are of potentially high-value to a particular front-end user (e.g., a client/company).

In some implementations, as a preliminary operation, the method 2200 includes harvesting, using an application program interface (API) associated with a fourth website, one or more fourth posts in the plurality of posts (cf. 2208) from the fourth website. For example, several prominent social networking sites provide API's for harvesting a subset of the post published thereon. Often, users of such social networking sites will published posts on the social networking sites, for example, expressions frustration or satisfaction regarding a company and/or their product (e.g., the post represents high value information to the company). In some circumstances, such a post will be made available publicly using the social networking sites API, and thus can be harvested in that manner.

The method 2200 includes receiving (2208) a plurality of data streams. Each of the data streams includes a plurality of posts (e.g., via any of the harvesting operations 2202, 2204, and/or 2206). Each of the posts includes a content portion and one or more source characteristics. In some implementations, the one or more source characteristics include (2210) one or more of author information and publisher information.

In some implementations, the method 2200 further includes normalizing (2212) the author information and/or publisher information according to a standard author and/or publisher source format. For example, in some circumstances, author information for first posts (cf. 2202) will be held in a field unique to the first website, whereas author information for second posts (cf. 2202) will be held in a field unique to the second website. In this example, normalizing the author information according to a standard author format will include parsing the first posts and second posts in accordance with the first and second websites, respectively, to produce consistent author packets regardless of their origin. In this manner, the origin of a post (e.g., the first or second website) is transparent to downstream elements of the computer system.

In some implementations, the method 2200 further includes associating (2214) the author information and the publisher information with respective posts associated with the same author and/or publisher. For example, a publisher profile is accessed in publisher store 530 and said publisher profile is updated with the publisher information. As another example, an author profile is accessed in author store 532 and said author profile is updated with the author information. In some implementations, associating operation 2214 occurs in real-time. In some implementations, associating operation 2214 occurs in near real-time.

The method 2200 further includes, in real time (2216), for each post in a particular data stream:
  assigning (2218) the post a post identifier (e.g., a post UUID);
  assigning (2220) each of the one or more source characteristics a respective source identifier (e.g., an author or publisher UUID);
  generating (2222) a content packet and one or more source packets; the content packet includes a respective source identifier and content information corresponding to the content portion of the post, and the one or more source packets each include the post identifier as well as source information corresponding to a respective source characteristic;
  querying (2224) the memory to access a source profile using the respective source identifier;

correlating (2226) the content packet with information from the source profile to produce a correlated content packet broadcasting (2228) the correlated content packet to a plurality of mission definitions (e.g., filter graphs); each of the mission definitions is configured to identify posts with high value information according to the respective mission definition, each of the mission definitions being configured to execute on at least a subset of the plurality of processors.

In some implementations, the method 2200 further includes, in near real-time, updating (2230) the source profile using the information corresponding to the respective source characteristics.

In some implementations, the method 2200 further includes indexing (2232) each post in the data stream, and storing each post in the data stream. In some implementations, one or both of the indexing and storing operations occurs in real-time. In some implementations, one or both of the indexing and storing operations occurs in near real-time.

In some implementations, the computer system includes (2234) a source profile caching sub-system with one or more cache levels including at least a first-level cache storing a plurality of first source profiles and a second-level cache storing a plurality of second source profiles. In such implementations, the querying 2218 further includes one or more of the following operations:

transmitting (2236) the respective source identifier to a first-level cache. In some implementations;

querying (2238) the first-level cache to access the source profile using the respective source identifier;

automatically transmitting (2240), when querying of the first-level cache returns a result corresponding to a first-level cache-miss, the respective source identifier to the second-level cache;

querying (2242) the second-level cache to access the source profile using the respective source identifier transferring (2244), when the second-level cache returns a result corresponding to a second-level cache hit, the source profile to the first-level cache memory, thereby adding the source profile to the first source profiles.

discarding (2246), from the first source profiles, respective ones of the first source profiles according to least-recently posted criteria.

In some implementations, each of the mission definitions (e.g., filter graphs) includes a plurality of classification models (e.g., filter nodes), each of which is configured to accept or reject individual posts in a data stream based on content and/or metadata information associated with the individual posts. In some embodiments, the classification models (e.g., filter nodes) included in a respective mission definition are combined (e.g., arranged) according to a predefined arrangement so as to identify the individual posts with high value information according to the respective mission definition (e.g., based on relevance of content and/or metadata information associated with a post with respect to an interest associated with the filter node). Configuring the mission definitions to execute on at least a subset of the plurality of processors includes preparing the models for executing on respective ones of the processors. In some implementations, the classification models include a plurality of natural language filters. In some implementations, the natural language filters are specified lexically using regular expressions. In some implementations, the regular expressions are implemented as deterministic finite automatons.

In some implementations, the source profile is based at least in part on information obtained from previously received posts associated the respective source identifier.

In some implementations, the least-recently posted criteria (cf. discarding operation 2246) include a least-recently author posted criterion whereby author profiles corresponding to authors who have posted more recently continue to be stored in a higher level author cache (e.g., a first level author cache) while author profiles corresponding to authors who have not posted recently are relegated to a lower level author cache (e.g., a second level author cache). Likewise, the least-recently posted criteria include a least-recently publisher posted criterion whereby publisher profiles corresponding to publishers who have posted more recently continue to be stored in a higher level publisher cache (e.g., a first level publisher cache) while publisher profiles corresponding to publishers who have not posted recently are relegated to a lower level publisher cache (e.g., a second level publisher cache). In some implementations, one or more respective first-level caches (e.g., author and/or publisher first-level caches) are of sufficient size to store, on average, all respective source profiles (e.g., author and/or publisher profiles) for which a corresponding packet has been received within a previous month.

Figure 23:
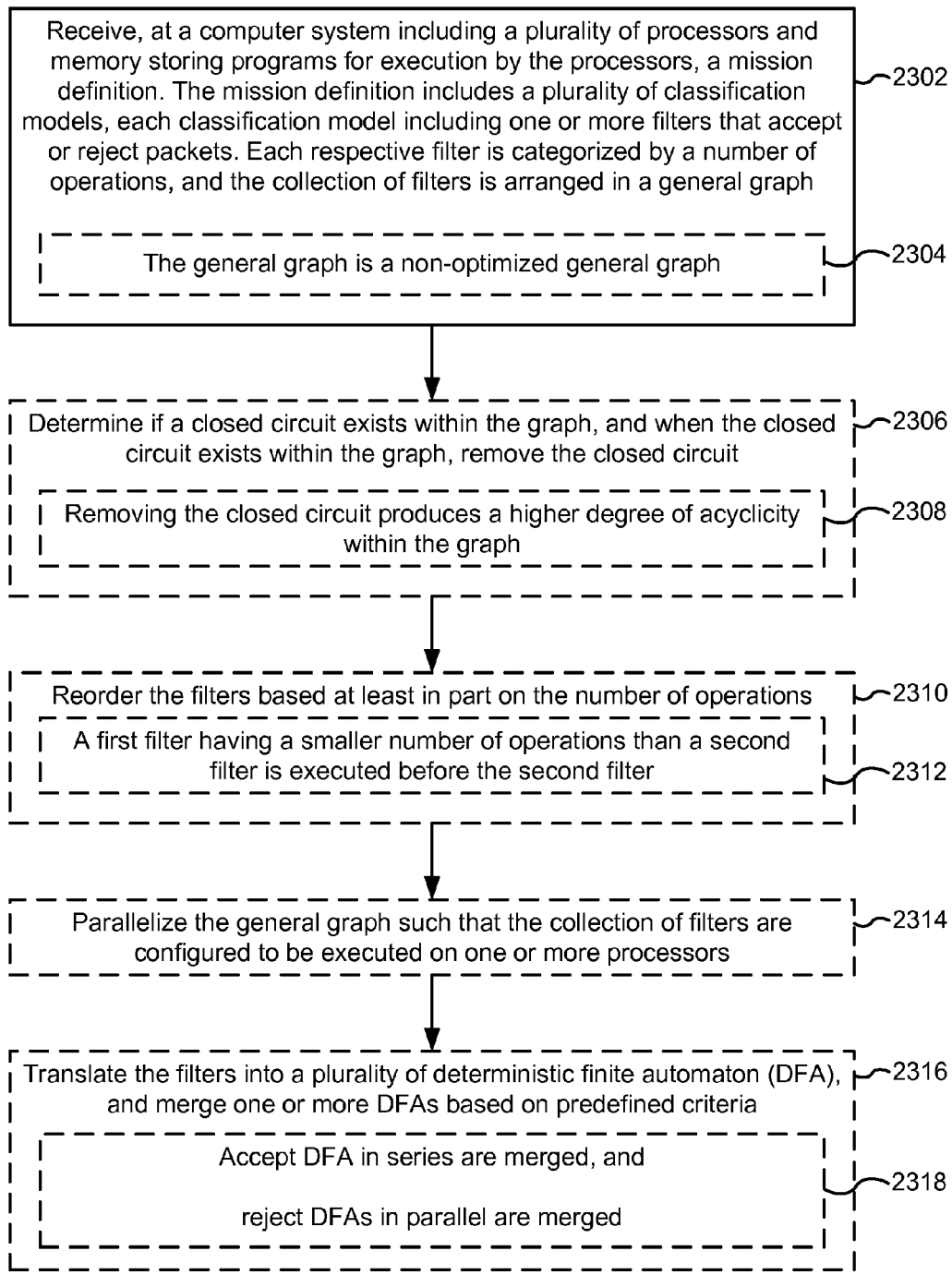
FIG. 23 is a flow chart illustrating a method for optimizing real-time, parallel execution of models for extracting high-value information from data streams, in accordance with some implementations.

FIG. 23 is a flow chart illustrating a method 2300 for optimizing real-time, parallel execution of models for extracting high-value information from data streams, in accordance with some implementations.

The method includes receiving (2302) a mission definition (e.g., filter graphs). The mission definition includes a plurality of classification models (e.g., filter nodes), each classification model including one or more filters that accept or reject packets. Each respective filter is categorized by a number of operations, and the collection of filters is arranged in a general graph. In some implementations, the mission definition is received at a compiler (e.g., parallelizing compiler 1504). In some implementations, the general graph is (2304) a non-optimized general graph.

In some implementations, the method further includes determining (2306) if a closed circuit exists within the graph, and when the closed circuit exists within the graph, removing the closed circuit. In some circumstances, removing the closed circuit produces a higher degree of acyclicity within the graph.

In some implementations, the method further includes reordering (2310) the filters based at least in part on the number of operations. In some implementations, a first filter having a smaller number of operations than a second filter is executed (2312) before the second filter (e.g., filters characterized by a smaller number of filters are executed before filters characterized by a larger number of filters).

In some implementations, the method further includes parallelizing (2314) the general graph such that the collection of filters are configured to be executed on one or more processors In some implementations, the method further includes translating (2316) the filters into a plurality of deterministic finite automaton (DFA), and merging one or more DFAs based on predefined criteria. In some implementations, accept DFA in series are merged, and reject DFAs in parallel are merged.

Reference has been made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof. The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for real-time extraction of high-value information from data streams, comprising:
    at a computer system including a plurality of processors and memory storing programs for execution by the processors,
    receiving a plurality of data streams, wherein each of the data streams includes a plurality of posts, wherein each of the posts includes a content portion and one or more source characteristics;
    in real time, for each post in a particular data stream:
        assigning the post a post identifier;
        generating a content packet, wherein the content packet includes:
            a respective source identifier corresponding to a respective source profile, wherein the respective source profile includes information obtained from previously received posts associated the respective source identifier, and
            content information corresponding to the content portion of the post;
        querying the memory to access a source profile using the respective source identifier;
        correlating the content packet with information from the source profile to produce a correlated content packet, the information including at least some of the information obtained from the previously received posts associated the respective source identifier;
        broadcasting the correlated content packet to a plurality of filter graph definitions, wherein each of the filter graph definitions is configured to identify posts with high value information according to the respective filter graph definition, wherein posts are identified at least in part on based on both the information obtained from the previously received posts associated the respective source identifier and the content information corresponding to the content portion of the post, and each of the filter graph definitions is configured to execute on at least a subset of the plurality of processors.

2. The method of claim 1, further including:
    indexing each post in the data stream; and
    storing each post in the data stream.

3. The method of claim 1, wherein each of the filter graph definitions includes a plurality of filter nodes, each of which is configured to accept or reject individual posts in a data stream based on content and/or metadata information associated with the individual posts, and wherein the filter nodes included in a respective filter graph definition are combined according to a predefined arrangement so as to identify the individual posts with high value information according to the respective filter graph definition, wherein configuring the filter graph definitions to execute on at least a subset of the plurality of processors includes preparing the filter nodes for execution on respective ones of the processors.

4. The method of claim 1, further including:
assigning each of the one or more source characteristics a respective source identifier; and
generating one or more source packets, wherein the one or more source packets each include the post identifier as well as source information corresponding to a respective source characteristic.

5. The method of claim 4, further including, for each post in a particular data stream, after broadcasting the correlated content packet, updating the source profile using the one or more source packets.

6. The method of claim 1, wherein the one or more source characteristics include one or more of author information and publisher information.

7. The method of claim 6, further comprising normalizing the author information according to a standard author format.

8. The method of claim 6, further comprising normalizing the author information and the publisher information and associating the author information and the publisher information with respective posts associated with the same author and/or publisher using the respective source identifier.

9. The method of claim 8, wherein the filter nodes include a plurality of natural language filters.

10. The method of claim 9, wherein the natural language filters are specified lexically using regular expressions.

11. The method of claim 10, wherein the regular expressions are implemented as deterministic finite automatons.

12. The method of claim 1, wherein:
the computer system includes a source profile caching sub-system with one or more cache levels including at least a first-level cache storing a plurality of first source profiles; and
for each post in a particular data stream, querying the memory to access the source profile using the respective source identifier further includes:
transmitting the respective source identifier to the first-level cache; and
querying the first-level cache to access the source profile using the respective source identifier; and
when the querying of the first-level cache returns a result corresponding to a first-level cache hit, returning the source profile.

13. The method of claim 12, wherein the source profile caching sub-system further includes a second-level cache storing a plurality of second source profiles; and
querying the memory to access the source profile using the respective source identifier further includes:
when querying of the first-level cache returns a result corresponding to a first-level cache-miss, automatically transmitting the respective source identifier to the second-level cache; and
querying the second-level cache to access the source profile using the respective source identifier.

14. The method of claim 13, further including, when the second-level cache returns a result corresponding to a second-level cache hit, transferring the source profile to the first-level cache memory, thereby adding the source profile to the first source profiles; and
discarding, from the first source profiles, respective ones of the first source profiles according to least-recently posted criteria.

15. The method of claim 14, wherein the first-level cache is of sufficient size to store, on average, all source profiles for which a corresponding packet has been received within a previous month.

16. The method of claim 1, further including:
harvesting, using a third-party data aggregator, at least one first post in the plurality of posts from a first web site; and
harvesting, using the third-party data aggregator, at least one second post in the plurality of posts from a second web site.

17. The method of claim 1, further including harvesting, using a direct crawler associated with a third website, one or more third posts in the plurality of posts from the third web site.

18. The method of claim 1, further including harvesting, using an application program interface associated with a fourth website, one or more fourth posts in the plurality of posts from the fourth web site.

19. A computer system for identifying high-value information in data streams, comprising:
one or more processors;
memory storing one or more programs to be executed by the one or more processors;
the one or more programs comprising instructions for:
receiving a plurality of data streams, wherein each of the data streams includes a plurality of posts, wherein each of the posts includes a content portion and one or more source characteristics;
in real time, for each post in a particular data stream:
assigning the post a post identifier;
generating a content packet, wherein the content packet includes:
a respective source identifier corresponding to a respective source profile, wherein the respective source profile includes information obtained from previously received posts associated the respective source identifier, and
content information corresponding to the content portion of the post;
querying the memory to access a source profile using the respective source identifier;
correlating the content packet with information from the source profile to produce a correlated content packet, the information including at least some of the information obtained from the previously received posts associated the respective source identifier;
broadcasting the correlated content packet to a plurality of filter graph definitions, wherein each of the filter graph definitions is configured to identify posts with high value information according to the respective filter graph definition, wherein posts are identified at least in part on based on both the information obtained from the previously received posts associated the respective source identifier and the content information corresponding to the content portion of the post, and each of the filter graph definitions is configured to execute on at least a subset of the plurality of processors.

20. A non-transitory computer readable storage medium storing one or more programs configured for execution by a computer system, the one or more programs comprising instructions for:
receiving a plurality of data streams, wherein each of the data streams includes a plurality of posts, wherein each of the posts includes a content portion and one or more source characteristics;
in real time, for each post in a particular data stream:
assigning the post a post identifier;
generating a content packet, wherein the content packet includes:

a respective source identifier corresponding to a respective source profile, wherein the respective source profile includes information obtained from previously received posts associated the respective source identifier, and content information corresponding to the content portion of the post;

querying the memory to access a source profile using the respective source identifier;

correlating the content packet with information from the source profile to produce a correlated content packet, the information including at least some of the information obtained from the previously received posts associated the respective source identifier;

broadcasting the correlated content packet to a plurality of filter graph definitions, wherein each of the filter graph definitions is configured to identify posts with high value information according to the respective filter graph definition, wherein posts are identified at least in part on based on both the information obtained from the previously received posts associated the respective source identifier and the content information corresponding to the content portion of the post, and each of the filter graph definitions is configured to execute on at least a subset of the plurality of processors.

* * * * *